(12) United States Patent
Hoang et al.

(10) Patent No.: US 8,962,775 B2
(45) Date of Patent: Feb. 24, 2015

(54) FEEDING HIGHLY ACTIVE PHOSPHINIMINE CATALYSTS TO A GAS PHASE REACTOR

(75) Inventors: Peter Phung Minh Hoang, Calgary (CA); Cliff Robert Baar, Calgary (CA); P. Scott Chisholm, Calgary (CA); Rajesh Dahyabhai Patel, Calgary (CA)

(73) Assignee: Nova Chemicals (International) S.A, Fribourg (CH)

( * ) Notice: Subject to any disclaimer, the term of this patent is extended or adjusted under 35 U.S.C. 154(b) by 0 days.

(21) Appl. No.: 13/559,969

(22) Filed: Jul. 27, 2012

(65) Prior Publication Data
US 2013/0053524 A1 Feb. 28, 2013

(30) Foreign Application Priority Data
Aug. 23, 2011 (CA) .................................... 2749835

(51) Int. Cl.
  C08F 4/649 (2006.01)
  C08F 4/642 (2006.01)
  C08F 4/6592 (2006.01)
  C08F 210/02 (2006.01)
  C08F 2/34 (2006.01)
  C08F 210/16 (2006.01)
  C08F 4/659 (2006.01)

(52) U.S. Cl.
  CPC ............... C08F 2/34 (2013.01); C08F 210/16 (2013.01); *C08F 4/65912* (2013.01); *C08F 4/65916* (2013.01); *C08F 2420/04* (2013.01); *Y10S 526/943* (2013.01)
  USPC ........... 526/161; 526/160; 526/165; 526/148; 526/943; 502/103; 502/120; 502/152; 502/162; 502/167

(58) Field of Classification Search
  CPC .. C08F 4/649; C08F 4/65912; C08F 4/65916; C08F 4/6592; C08F 210/02
  USPC .......... 502/103, 120, 152, 162, 167; 526/160, 526/161, 165, 348, 943
  See application file for complete search history.

(56) References Cited

U.S. PATENT DOCUMENTS

| | | |
|---|---|---|
| 3,248,179 A | 4/1966 | Norwood |
| 3,726,845 A | 4/1973 | Nickerson |
| 3,876,602 A | 4/1975 | Calvert et al. |
| 4,325,849 A | 4/1982 | Rosen et al. |
| 4,482,687 A | 11/1984 | Noshay et al. |
| 4,543,399 A | 9/1985 | Jenkins, III et al. |
| 4,588,790 A | 5/1986 | Jenkins, III et al. |
| 4,610,574 A | 9/1986 | Peters |
| 4,613,484 A | 9/1986 | Ayres et al. |
| 4,767,028 A | 8/1988 | Rohlfing et al. |
| 5,026,795 A | 6/1991 | Hogan |
| 5,028,670 A | 7/1991 | Chinh et al. |
| 5,098,667 A | 3/1992 | Young et al. |
| 5,240,683 A | 8/1993 | Maurel et al. |
| 5,283,278 A | 2/1994 | Daire et al. |
| 5,317,036 A | 5/1994 | Brady, III et al. |
| 5,352,749 A | 10/1994 | DeChellis et al. |
| 5,362,416 A | 11/1994 | Costa |
| 5,385,992 A | 1/1995 | Koskinen et al. |
| 5,405,922 A | 4/1995 | DeChellis et al. |
| 5,433,924 A | 7/1995 | Sagar et al. |
| 5,436,304 A | 7/1995 | Griffin et al. |
| 5,462,999 A | 10/1995 | Griffin et al. |
| 5,616,661 A | 4/1997 | Eisinger et al. |
| 5,641,721 A | 6/1997 | Pentti et al. |
| 5,668,228 A | 9/1997 | Chinh et al. |
| 5,684,097 A | 11/1997 | Palmroos et al. |
| 5,693,727 A | 12/1997 | Goode et al. |
| 5,922,818 A | 7/1999 | Morterol |
| 5,948,871 A | 9/1999 | Goode et al. |
| 5,965,677 A | 10/1999 | Stephan et al. |
| 6,022,935 A | 2/2000 | Fischer et al. |
| 6,114,479 A | 9/2000 | Speca et al. |
| 6,124,230 A | 9/2000 | Speca et al. |
| 6,140,432 A | 10/2000 | Agapiou et al. |
| 6,245,868 B1 | 6/2001 | Agapiou et al. |
| 6,300,436 B1 | 10/2001 | Agapiou et al. |
| 6,306,984 B1 | 10/2001 | Agapiou et al. |
| 6,319,995 B2 | 11/2001 | Glenn et al. |
| 6,391,819 B1 | 5/2002 | Agapiou et al. |
| 6,399,535 B1 | 6/2002 | Shih et al. |
| 6,468,936 B1 | 10/2002 | Reddy et al. |
| 6,472,342 B2 | 10/2002 | Agapiou et al. |
| 6,559,090 B1 | 5/2003 | Shih et al. |
| 6,562,924 B2 | 5/2003 | Benazouzz et al. |

(Continued)

FOREIGN PATENT DOCUMENTS

| | | |
|---|---|---|
| EP | 107127 | 5/1984 |
| EP | 798315 B1 | 10/1997 |

(Continued)

OTHER PUBLICATIONS

R.P. Spence et al; Cyclopentadienyl Phosphinimine Ti Cat.—Structure, Activity and Product Relationships in Heterogeneous Olefin Polymerization NOVA Chemicals Corp; CIC 2002.
J. B. Peri and A. L. Hensley Jr., the surface structure of silica gel, J. Phys. Chem., 72 (8), 1968, p. 2926.-2933.
Clark et al, Catalysts, Supported, Kirk-Othmer Encyclopedia of Chemical Technology, John Wiley & Sons, Inc, pub. online 2001, pp. 1-37.
Brunauer et al, adsorption of gases in multimolecular layers, JACS, 1938, v 60, p. 309-319.
Zwietering, suspending of solid particles in liquied by agitators, Chem. Eng. Sci. 1958, vol. 8, pp. 244-253, Pergamon Press Ltd.

*Primary Examiner* — Caixia Lu
(74) *Attorney, Agent, or Firm* — Kenneh H. Johnson (57) ABSTRACT

A highly active, supported phosphinimine catalyst is fed to a gas phase reactor as a slurry in a liquid hydrocarbon. Feeding the catalyst to a gas phase reactor in a viscous liquid hydrocarbon modifies catalyst initiation kinetics.

9 Claims, 3 Drawing Sheets

(56) References Cited

U.S. PATENT DOCUMENTS

| | | |
|---|---|---|
| 6,586,544 B2 | 7/2003 | Szul et al. |
| 6,608,153 B2 | 8/2003 | Agapiou et al. |
| 6,617,405 B1 | 9/2003 | Jorgensen |
| 6,686,306 B2 | 2/2004 | Shih |
| 6,703,458 B2 | 3/2004 | Fait |
| 6,720,396 B2 | 4/2004 | Bell et al. |
| 6,734,131 B2 | 5/2004 | Shih et al. |
| 6,777,366 B2 | 8/2004 | Gauthier et al. |
| 6,777,367 B2 | 8/2004 | Gauthier et al. |
| 6,872,682 B1 | 3/2005 | Alastalo et al. |
| 6,908,971 B2 | 6/2005 | Burns et al. |
| 6,936,226 B2 | 8/2005 | Agapiou et al. |
| 6,956,089 B2 | 10/2005 | Mawson et al. |
| 6,958,375 B2 | 10/2005 | Shih et al. |
| 7,005,398 B2 | 2/2006 | Ishigaki et al. |
| 7,064,096 B1 | 6/2006 | Hoang et al. |
| 7,202,313 B2 | 4/2007 | Jorgensen |
| 7,232,868 B2 | 6/2007 | Smith et al. |
| 7,321,015 B2 | 1/2008 | Hoang et al. |
| 7,323,523 B2 | 1/2008 | Hoang et al. |
| 7,354,880 B2 | 4/2008 | Agapiou et al. |
| 7,476,715 B2 | 1/2009 | McKay et al. |
| 7,494,626 B2 | 2/2009 | Smith et al. |
| 7,528,090 B2 | 5/2009 | Jacobsen et al. |
| 7,531,602 B2 | 5/2009 | Hoang et al. |
| 7,645,843 B2 | 1/2010 | Elovainio et al. |
| 7,705,095 B2 | 4/2010 | Kimberley et al. |
| 7,803,324 B2 | 9/2010 | Burns et al. |
| 7,891,527 B2 | 2/2011 | Dentler et al. |
| 8,304,361 B2 * | 11/2012 | Gao et al. .................... 502/152 |
| 2002/0107342 A1 | 8/2002 | Mawson et al. |
| 2002/0137861 A1 | 9/2002 | Song |
| 2003/0203809 A1 | 10/2003 | Kao et al. |
| 2007/0191215 A1 * | 8/2007 | Muruganandam et al. ... 502/103 |
| 2008/0039596 A1 | 2/2008 | Fouarge |
| 2008/0045406 A1 | 2/2008 | McKay et al. |
| 2010/0190937 A1 | 7/2010 | Hoang et al. |
| 2010/0249345 A1 | 9/2010 | Richter et al. |
| 2011/0088787 A1 | 4/2011 | Lynn |
| 2011/0130531 A1 | 6/2011 | Hussein et al. |

FOREIGN PATENT DOCUMENTS

| | | |
|---|---|---|
| EP | 811638 A2 | 12/1997 |
| EP | 819706 B1 | 1/1998 |
| EP | 924226 A1 | 6/1999 |
| EP | 1660231 B1 | 8/2005 |
| GB | 838395 | 6/1960 |
| WO | WO 92/16747 | 10/1992 |
| WO | WO 96/34020 | 10/1996 |
| WO | WO 00/47638 | 8/2000 |
| WO | WO 2004/026455 | 4/2004 |
| WO | WO 2009043157 A1 | 4/2009 |

* cited by examiner

Fig. 1

Ethylene Flow and Temperature Profile – Dry Feed of Supported $((C_6F_5)Cp)Ti(N=P(t-Bu)_3)X_2)$ / MAO Fig. 2
Ethylene Flow and Temperature Profile – Dry Feed of Supported
$((C_6F_5)Cp)Ti(N=P(t-Bu)_3)X_2)$ / MAO Fig. 3
Ethylene Flow and Temperature Profile – Slurry Feed of Supported $((C_6F_5)Cp)Ti(N=P(t-Bu)_3)X_2)$ / MAO

FEEDING HIGHLY ACTIVE PHOSPHINIMINE CATALYSTS TO A GAS PHASE REACTOR

FIELD OF THE INVENTION

The current invention is relevant to the field of ethylene polymerization with a single site catalyst. Single site catalysts, which are highly active in gas phase polymerization often operate with poor reaction kinetics which may lead to reactor fouling during polymerization. The present invention describes the use of a highly active and supported phosphinimine catalyst, which when fed to a gas phase reactor as a slurry in a viscous hydrocarbon, has improved reaction kinetics.

BACKGROUND OF THE INVENTION

There are many methods by which to feed an active catalyst composition to gas phase polymerization reactor. These include dry mode addition in which solid catalyst particles are fed directly to a reactor under positive gas pressure (see for example U.S. Pat. Nos. 3,876,602, 5,433,924, 5,240,683, 7,891,527 and references therein), addition of solubilized or unsupported catalyst compositions (see U.S. Pat. Nos. 5,317,036, 5,693,727, 5,948,871 and 6,586,544) and the use of slurry feed systems to deliver suspended catalyst compositions (see for example U.S. Pat. Nos. 4,767,028, 4,610,574, 6,319,995, 6,908,971, 6,936,226, U.S. Pat. Appl. No. 2008/0039596, European Pat. No. 1,660,231 and references therein).

Feeding of traditional Ziegler-Natta and Phillips catalysts, which are solids, in a mineral oil to a gas phase reactor is known to improve catalyst activity (see U.S. Pat. No. 5,362,416) and to reduce fouling associated with static build up (see U.S. Pat. No. 7,202,313) respectively.

Particulate, single site catalysts such as supported metallocenes have been fed to a gas phase reactor as a slurry in inert hydrocarbon liquids including more viscous materials such as mineral oil. Several advantages are claimed to be associated with slurry feeding a supported metallocene catalyst such as improved particle morphology, better control over catalyst feeding rates, improved catalyst pre-polymerization shelf life, improved activity and reduced catalyst feeder and reactor fouling.

European Pat. No. 819,706 B1 demonstrates bulk phase polymerization of propylene using an activated and supported metallocene catalyst fed to a reactor as slurry in mineral oil. An organoaluminum compound is included in the slurry formulation. In U.S. Pat. No. 6,468,936, a similar mineral oil slurry of a supported metallocene catalyst, one which is prepared using a method which involves a solvent removal step, is used to form stereoregular propylene polymers in the slurry phase. The use of the solvent free catalyst in a mineral oil slurry improved post-polymerization reactor clean up. U.S. Pat. Nos. 6,777,366 and 6,777,367 provide another method by which to form a supported catalyst slurry in mineral oil. In this particular method, the catalyst species is combined with a supported activator at temperatures below 10° C. in the presence of solvent, followed by washing with a paraffinic hydrocarbon and dispersal in a mineral oil.

European Pat. Appl. No. 811,638 A2 exemplifies gas phase polymerization in a fluidized bed reactor, in which a supported metallocene slurried in mineral oil (at 20 wt %) is fed to the reactor using a piston-type pump. Isopentane and nitrogen were used to flush the slurry to the reactor. The antistat Atmer-163™ was sprayed into the reactor separately as a dilute solution in isopentane.

U.S. Pat. Appl. No. 2002/0137861 teaches that feeding a slurry of a supported metallocene in Kaydol mineral oil to a gas phase reactor can lead to polymer agglomeration unless the mineral oil slurry further comprises an alkylaluminum scavenger compound. The supported metallocene used in the examples was rac-dimethylsilylbis(tetra-hydroindenyl)zirconium dichloride and the mineral oil slurry contained 20 percent by weight of the supported catalyst.

U.S. Pat. Appl. No. 2010/0249345 teaches the formation of a catalyst "mud" or "paste" comprising a support bearing functional groups, a transition metal organometallic compound and specific activator compounds in an oil. Kaydol mineral oil and grease were used in the examples to form the catalyst paste.

U.S. Pat. Appl. No. 2003/0203809 relates to a catalyst composition comprising an activator, a support, a catalyst compound and an ionizing activator and which is formed in a diluent having a flash point of greater than 200° F. A suitable diluent is Kaydol mineral oil. The catalysts can be fed directly to a polymerization reactor as a slurry in mineral oil.

In U.S. Pat. No. 7,232,868 a polymerization process involves providing a catalyst slurry containing a metallocene catalyst and a first oil, providing a transport medium which is a second oil (which can be the same or different than the first oil), and combining the transport medium and the catalyst slurry to form a catalyst mixture which is then introduced into a polymerization reactor to polymerize olefins. The patent focuses on the mixing vessels and methods used to form the metallocene catalyst slurry and to combine the same with the transport medium. Propylene polymerization is preferred.

U.S. Pat. No. 7,645,843 describes a method for feeding a solid catalyst component to a polymerization reactor which involves suspending the solid component in an oil having a viscosity of 20 to 1500 mPa·s and subsequently metering the suspension into the reactor with a "valveless" piston pump. Preferably, the suspension further comprises a drag reduction reagent. Ziegler-Natta catalysts, chromium catalysts and supported metallocene catalysts are contemplated for use.

European Pat. No. 798,315 B1 discloses a method of making homogeneous mixtures comprising a metallocene catalyst in a viscous liquid hydrocarbon. The metallocene catalyst may be supported on an appropriate inert material. An exemplified liquid hydrocarbon is white mineral oil.

U.S. Pat. No. 7,005,398 discloses an olefin polymerization catalyst comprising a supported ionic activator, a metallocene compound, an organometallic compound and a "hydrocarbon" where the hydrocarbon can be a liquid hydrocarbon with a kinematic viscosity of 5.0 $mm^2/s$ or greater at 30° C., a solid hydrocarbon which is not a crystalline olefin polymer, or a crystalline olefin polymer. As an example of a crystalline olefin polymer, a polyolefin wax is taught. The catalyst is claimed to have improved storage shelf life.

In U.S. Pat. Appl. No. 2011/0130531 a spray dried solid polymerization catalyst comprising a supported metallocene catalyst is diluted in a liquid hydrocarbon to give a catalyst slurry. Injection of the catalyst slurry into a fluidized bed polymerization reactor gave a catalyst productivity of at least 12,000 grams of polyethylene per gram of the catalyst system. Mixtures of mineral oil and aliphatic hydrocarbons are used as diluents for the catalyst slurry formation.

Although mineral oil is often used to form catalyst slurries due to its relatively high viscosity, solid catalyst components have also been fed to a gas phase fluidized bed reactor as a slurry in a non-viscous hydrocarbon. U.S. Pat. No. 5,922,818 describes a method in which a measured amount of solid catalyst can be metered into a gas-phase reactor by first mixing it with a liquid hydrocarbon in a mixing chamber to form a suspension, followed by introduction into a gas-phase reaction zone. Solid metallocene catalysts are contemplated for use.

Slurry feed allows for catalyst modifier components to be sprayed into a reactor simultaneously with the polymerization catalysts. U.S. Pat. No. 6,245,868 provides a method of delivering a supported "bulky ligand metallocene" catalyst system to a gas phase polymerization reactor by utilizing a carrier solution comprising an antistatic agent and a liquid diluent, where the carrier solution serves to flush the supported catalyst system into the reactor. The method is said to improve catalyst delivery, catalyst efficiency and particle morphology. The method also avoids problems associated with dry catalyst feed such as catalyst injection tube plugging. The liquid hydrocarbon used is any capable of maintaining the antistatic agent in a dissolved state and includes numerous organic solvents such as volatile hydrocarbons selected from n-pentane, isopentane, n-butane, isobutane, n-hexane, etc. The use of mineral oil as a liquid diluent is not contemplated.

U.S. Pat. No. 6,720,396 describes the use of a supported catalyst composition in a slurry of hydrocarbon liquid, where the volume of the liquid is less than four times the pore volume of the support, and where the slurry is left to stand for a period of time before its use in a polymerization reactor. Slurry polymerization is preferred and the liquids contemplated for use do not include mineral oil.

Slurry feeding also allows for in-line mixing of various catalyst components which make up a final polymerization catalyst system. See for example, U.S. Pat. Appl. No. 2002/0107342, which describes a method for combining a catalyst component in a mineral oil slurry with a catalyst component in a liquid hydrocarbon on route to a fluidized bed reactor. The use of two different catalyst component carrier streams allows for quick modification of the catalyst component ratios before the catalyst enters the reactor. Both supported and unsupported catalyst components can be employed.

The use of small amounts of an inert hydrocarbon in combination with a supported catalyst is known to modulate polymerization kinetics. U.S. Pat. Nos. 7,705,095 and 7,528,090 teach the addition of an inert hydrocarbon to a supported constrained geometry catalyst in amounts which do not exceed the pore volume of the support. Such a catalyst, which remains a free flowing solid, nevertheless has a lengthened induction period when used in gas phase polymerization. The inert hydrocarbons contemplated by the '090' patent included waxes, hydrocarbon liquids and oils. The inert hydrocarbons contemplated by the '095' patent included lower alkanes or aromatics, with hexane being preferred. These patents also make reference to, but do not exemplify, the use of other supported catalyst systems such as chromium catalysts, Ziegler-Natta catalysts, metallocene catalysts and phosphinimine catalysts. The patents do not, however, teach the use of phosphinimine catalysts which are specifically substituted for enhanced gas phase polymerization activity and performance.

WO 96/34020 contains a similar teaching. Exemplified are supported metallocene catalysts coated with an inert material such as an inert hydrocarbon having a molecular weight of from 200 to about 5000, low molecular weight ethylene or styrene polyolefins and the like. Multiwax 195M and poly-paramethylstyrene are used in the examples. The solid, supported catalysts coated with wax or polymer remained free flowing and reduced the tendency toward sheeting or fouling in a gas phase polymerization process.

European Pat. Appl. No. 924,226 A1 discloses a polymerization catalyst comprising a metallocene catalyst, a support material, an activator and a hydrocarbon or organic silicon material having a molecular weight of preferably more than 300. Liquid paraffins and waxes for example, were used as the hydrocarbon component.

U.S. Pat. No. 5,965,677 teaches the use of a supported phosphinimine catalyst. In the examples section, the patent specifically teaches that the supported catalysts may be coated with a thin layer of mineral oil in order to improve their shelf life stability before use. A suspension of a supported phosphinimine catalyst is fed to a gas reactor under positive nitrogen pressure. Although a wide variety of substituted and unsubstituted phosphinimine catalysts having the formula $Cp(PI)MX_2$ (where Cp is a cyclopentadienyl type ligand, PI is a phosphinimine type ligand and each X is an activatable ligand) are considered, polymerization activity data was reported only for $(C_5H_5)Ti(N=P(t-Bu)_3)_2X_2$ type catalysts which have an unsubstituted cyclopentadienyl ligand.

In a disclosure made at the 2002 Canadian Society for Chemistry Conference ("*Cyclopentadienyl Phosphinimine Titanium Catalysts—Structure, Activity and Product Relationships in Heterogeneous Olefin Polymerization.*" R. P. Spence; I. Mckay; C. Carter; L. Koch; D. Jeremic; J. Muir; A. Kazakov. NOVA Chemicals Corporation, CIC, 2002), it was shown that the addition of a fluorinated aryl group (e.g. $C_6F_5$), to a cyclopentadienyl ligand or an indenyl ligand of a supported phosphinimine catalyst can increase catalyst activity in a gas phase polymerization process. Disclosure of similar catalyst systems occurs in U.S. Pat. Appl. No. 2008/0045406 A1, which features a supported phosphinimine catalyst comprising a $C_6F_5$ substituted cyclopentadienyl ligand, and in U.S. Pat. Nos. 7,531,602, 7,064,096, 7,323,523 and 7,321,015, which discuss the use of supported phosphinimine catalysts having a 1,2-(n-propyl)($C_6F_5$)Cp ligand, a 1,2-(n-butyl)($C_6F_5$)Cp ligand and a 1,2-(n-hexyl)($C_6F_5$)Cp ligand, mainly in dual catalyst formulations. The use of such catalysts, which have high activity in gas phase polymerization reactions, can lead to reactor operability issues including reactor fouling. None of the forgoing disclosures discuss the improvement to initiation kinetics possible when feeding similarly substituted, highly active, supported phosphinimine catalysts to a gas phase reactor as a slurry in a liquid hydrocarbon carrier such as, for example, mineral oil.

SUMMARY OF THE INVENTION

We have now found, that feeding a supported, suitably substituted phosphinimine based polymerization catalyst as a slurry in a suitable liquid hydrocarbon carrier, such as mineral oil, directly to a gas phase reactor provides for high overall productivity with improved polymerization reaction kinetics.

Provided is a gas phase polymerization process comprising: introducing ethylene and at least one alpha olefin to a gas-phase reactor; introducing a catalyst slurry comprising a supported polymerization catalyst and a liquid hydrocarbon carrier to the gas phase reactor; and polymerizing the ethylene and the at least one alpha olefin in the presence of the supported polymerization catalyst; wherein the supported polymerization catalyst comprises: i) a phosphinimine catalyst having the formula $((R^*)(Ar-F)C_5H_3)Ti(N=P(t-Bu)_3)X_2$; where $R^*$ is hydrogen or a hydrocarbyl group; Ar—F is a perfluorinated aryl group, a 2,6 fluoro substituted phenyl group, a 2,4,6 fluoro substituted phenyl group, or a 2,3,5,6 fluoro substituted phenyl group; and X is an activatable ligand; ii) a cocatalyst, and iii) an inert support.

Provided is a polymerization process comprising: introducing ethylene and at least one alpha olefin to a gas-phase reactor; introducing a catalyst slurry comprising a supported polymerization catalyst and a mineral oil to the reactor; and polymerizing the ethylene and the at least one alpha olefin in the presence of the supported polymerization catalyst; wherein said supported polymerization catalyst comprises: i) a phosphinimine catalyst having the formula $((R^*)(Ar\text{—}F)C_5H_3)Ti(N\text{=}P(t\text{-}Bu)_3)X_2$; where $R^*$ is hydrogen or a hydrocarbyl group, Ar—F is a perfluorinated aryl group, a 2,6 fluoro substituted phenyl group, a 2,4,6 fluoro substituted phenyl group or a 2,3,5,6 fluoro substituted phenyl group; and X is an activatable ligand; ii) a cocatalyst, and iii) an inert support.

Provided is a method for increasing the induction period of a supported polymerization catalyst in a gas phase polymerization process, the method comprising: combining the supported polymerization catalyst with mineral oil to give a catalyst slurry; and introducing the slurry to a gas phase reactor to polymerize ethylene and at least one alpha olefin; wherein the supported polymerization catalyst comprises: i) a phosphinimine catalyst having the formula $((R^*)(Ar\text{—}F)C_5H_3)Ti(N\text{=}P(t\text{-}Bu)_3)X_2$; where $R^*$ is hydrogen or a hydrocarbyl group; Ar—F is a perfluorinated aryl group, a 2,6 fluoro substituted phenyl group, a 2,4,6 fluoro substituted phenyl group or a 2,3,5,6 fluoro substituted phenyl group; and X is an activatable ligand; ii) a cocatalyst, and iii) an inert support.

Also provided is a method of feeding a polymerization catalyst to a gas phase reactor the method comprising: forming a slurry of the polymerization catalyst in mineral oil, wherein the polymerization catalyst comprises: i) a phosphinimine catalyst having the formula $((R^*)(Ar\text{—}F)C_5H_3)Ti(N\text{=}P(t\text{-}Bu)_3)X_2$ where $R^*$ is a hydrogen or a hydrocarbyl group, Ar—F is a perfluorinated aryl group, a 2,6 fluoro substituted phenyl group, a 2,4,6 fluoro substituted phenyl group or a 2,3,5,6 fluoro substituted phenyl group, and X is an activatable ligand; ii) a cocatalyst; and iii) an inert support; and feeding the slurry to the gas phase polymerization reactor.

DETAILED DESCRIPTION OF PREFERRED EMBODIMENTS

The current invention is directed to gas phase polymerization which is catalyzed by feeding a slurry of a suitably substituted phosphinimine catalyst in a liquid hydrocarbon to a reactor. The suitably substituted phosphinimine catalysts are supported group 4 transition metal catalysts and must have as ligands a phosphinimine ligand, a cyclopentadienyl-type ligand which is minimally substituted with a perfluorinated aryl group, a 2,6 fluoro substituted phenyl group, a 2,4,6 fluoro substituted phenyl group, a 2,3,5,6 fluoro substituted phenyl group, or similar moiety, and two activatable ligands. The liquid hydrocarbon can be any suitable liquid hydrocarbon including non-viscous, volatile, and viscous liquid hydrocarbons. Viscous liquid hydrocarbons, such as, for example, mineral oils are preferred. A slurry is formed by suspending the supported phosphinimine catalyst in the liquid hydrocarbon. A co-catalyst is employed to activate the phosphinimine catalyst toward polymerization reactions. Polymerization is initiated by feeding the catalyst slurry directly to a gas phase polymerization reactor in which the supported polymerization catalyst is brought into contact with polymerizable olefins such as ethylene and alpha-olefins.

By feeding the highly active polymerization catalyst to a gas phase reactor as a slurry in a liquid hydrocarbon such as mineral oil, the polymerization kinetics are altered while the overall production rate remains virtually unchanged. For example, the polymerization time required to reach maximum catalyst polymerization activity (i.e. the induction period as measured for example by the time taken to reach maximum ethylene flow or consumption rate) may be increased, and/or the peak catalyst activity (measured as, for example, the maximum ethylene flow or consumption rate) may be decreased. In addition the measured polymerization exotherm may be decreased and/or reactor temperature excursions may be decreased.

The Polymerization Catalyst

In the present invention, the polymerization catalyst minimally includes a phosphinimine catalyst defined as below, an inert support defined as below and a cocatalyst defined as below.

The Phosphinimine Catalyst

The phosphinimine catalysts which are useful in the present invention are highly active for the gas phase polymerization of ethylene optionally with comonomers. A phosphinimine catalyst is a compound (typically an organometallic compound) based on a group 3, 4 or 5 metal and which is characterized as having at least one phosphinimine ligand. By "highly active" it is meant that the phosphinimine catalyst will provide ethylene (co)polymer with a minimum productivity of 1500 g of polymer (g pol) per gram of supported catalyst (g cat), preferably with a minimum productivity of 2000 g poly/g cat, or 2500 g poly/g cat, or 3000 g poly/g cat, or 3500 g poly/g cat. Any compounds/complexes having a phosphinimine ligand and which display catalytic activity for ethylene (co)polymerization may be called "phosphinimine catalysts".

Preferably, the phosphinimine catalyst is based on metals from group 4, which includes titanium, hafnium and zirconium. The most preferred phosphinimine catalysts are group 4 metal complexes in their highest oxidation state.

The phosphinimine catalysts described herein, usually require activation by one or more cocatalytic or activator species in order to provide polymer from olefins.

Suitable phosphinimine catalysts for use in the present invention include those having the formula: $(L)(PI)MX_2$; where M is Ti, Zr or Hf; PI is a phosphinimine ligand; L is a cyclopentadienyl-type ligand, which is minimally substituted with a perfluorinated aryl group, a 2,6 fluoro (i.e. ortho) substituted phenyl group, a 2,4,6 fluoro (i.e. ortho/para) substituted phenyl group, or a 2,3,5,6 fluoro (i.e ortho/meta) substituted phenyl group, or similar moiety; and each X is independently an activatable ligand.

In an embodiment of the invention, the phosphinimine catalysts will have the formula: $(Cp)(PI)MX_2$; where M is Ti, Zr or Hf; PI is a phosphinimine ligand; Cp is a cyclopentadienyl ligand, which is minimally substituted with perfluorinated aryl group, a 2,6 fluoro (i.e. ortho) substituted phenyl group, a 2,4,6 fluoro substituted phenyl group (i.e. ortho/para), or a 2,3,5,6 fluoro (i.e ortho/meta) substituted phenyl group; and X is an activatable ligand.

In another embodiment of the invention, the phosphinimine catalysts will have the formula: (Cp)(PI)TiX$_2$; where PI is a phosphinimine ligand; Cp is a cyclopentadienyl ligand, which is minimally substituted with perfluorinated aryl group, a 2,6 fluoro substituted phenyl group, a 2,4,6 fluoro substituted phenyl group, or a 2,3,5,6 fluoro substituted phenyl group; and X is an activatable ligand.

The phosphinimine ligand is defined by the formula: R$_3$P=N—, where N bonds to the metal, and wherein each R is independently selected from the group consisting of a hydrogen atom; a halogen atom; C$_{1-20}$ hydrocarbyl radicals which are unsubstituted or further substituted by one or more halogen atom and/or C$_{1-20}$ alkyl radical; C$_{1-8}$ alkoxy radical; C$_{6-10}$ aryl or aryloxy radical (the aryl or aryloxy radical optionally being unsubstituted or further substituted by one or more halogen atom and/or C$_{1-20}$ alkyl radical); amido radical; silyl radical of the formula: —SiR'$_3$ wherein each R' is independently selected from the group consisting of hydrogen, a C$_{1-8}$ alkyl or alkoxy radical, C$_{6-10}$ aryl or aryloxy radicals; and germanyl radical of the formula: —GeR'$_3$ wherein R' is as defined above.

In an embodiment of the invention, the phosphinimine ligand is chosen so that each R is a hydrocarbyl radical. In a particular embodiment of the invention, the phosphinimine ligand is tri-(tertiarybutyl)phosphinimine (i.e. where each R is a tertiary butyl group).

As used herein, the term "cyclopentadienyl-type" ligand is meant to describe a ligand containing an unsaturated five carbon ring which is bonded to the metal via eta-5 bonding. Thus, the term "cyclopentadienyl-type" ligand (i.e. L) includes, for example, cyclopentadienyl, indenyl and fluorenyl ligands. Hydrogenated versions of indenyl or fluorenyl ligands are also considered "cyclopentadienyl-type" ligands herein so long as the five carbon ring which is bonded to the metal via eta-5 bonding remains intact. In the current invention it is preferred that the cyclopentadienyl-type ligand be minimally substituted with perfluorinated aryl group, a 2,6 fluoro substituted phenyl group, a 2,4,6 fluoro substituted phenyl group or a 2,3,5,6 fluoro substituted phenyl group, but further substituents may also be present. An exemplary list of further substituents for a cyclopentadienyl, indenyl or fluorenyl ligand includes the group consisting of C$_{1-10}$ hydrocarbyl radical (which hydrocarbyl substituents are unsubstituted or further substituted by for example a halide and/or a hydrocarbyl group); a halogen atom; C$_{1-8}$ alkoxy radical; a C$_{1-10}$ aryl or aryloxy radical (each of which may be further substituted by for example a halide and/or a hydrocarbyl group); an amido radical which is unsubstituted or substituted by up to two C$_{1-8}$ alkyl radicals; a phosphido radical which is unsubstituted or substituted by up to two C$_{1-8}$ alkyl radicals; silyl radicals of the formula —Si(R')$_3$ wherein each R' is independently selected from the group consisting of hydrogen, a C$_{1-8}$ alkyl or alkoxy radical, C$_{6-10}$ aryl or aryloxy radicals; and germanyl radicals of the formula —Ge(R)$_3$ wherein R' is as defined directly above.

As used herein, the term "cyclopentadienyl ligand" (i.e. Cp) is meant to convey its conventional meaning, namely a ligand which is an unsaturated five carbon ring bonded to the metal via eta-5 bonding. In the current invention it is preferred that the cyclopentadienyl ligand be minimally substituted with perfluorinated aryl group, a 2,6 fluoro substituted phenyl group, a 2,4,6 fluoro substituted phenyl group, or a 2,3,5,6 fluoro substituted phenyl group, but further substituents may also be present. An exemplary list of further substituents for a cyclopentadienyl ligand includes the group consisting of C$_{1-10}$ hydrocarbyl radical (which hydrocarbyl substituents are unsubstituted or further substituted by for example a halide and/or a hydrocarbyl group); a halogen atom; C$_{1-8}$ alkoxy radical; a C$_{1-10}$ aryl or aryloxy radical (each of which may be further substituted by for example a halide and/or a hydrocarbyl group); an amido radical which is unsubstituted or substituted by up to two C$_{1-8}$ alkyl radicals; a phosphido radical which is unsubstituted or substituted by up to two C$_{1-8}$ alkyl radicals; silyl radicals of the formula —Si(R')$_3$ wherein each R' is independently selected from the group consisting of hydrogen, a C$_{1-8}$ alkyl or alkoxy radical, C$_{6-10}$ aryl or aryloxy radicals; and germanyl radicals of the formula —Ge(R')$_3$ wherein R' is as defined directly above.

In another embodiment of the invention, the phosphinimine catalysts will have the formula: ((R*)(Ar—F)C$_5$H$_3$)M (N=P(t-Bu)$_3$)X$_2$ where R* is a hydrogen or a hydrocarbyl group; Ar—F is a perfluorinated aryl group, a 2,6 (i.e. ortho) fluoro substituted phenyl group, a 2,4,6 fluoro (ortho/para) substituted phenyl group or a 2,3,5,6 (i.e. ortho/meta) fluoro substituted phenyl group; M is Ti, Zr or Hf; and X is an activatable ligand.

In another embodiment of the invention, the phosphinimine catalysts will have the formula: ((R*)(Ar—F)C$_5$H$_3$)Ti (N=P(t-Bu)$_3$)X$_2$ where R* is a hydrogen or a hydrocarbyl group; Ar—F is a perfluorinated aryl group, a 2,6 (i.e. ortho) fluoro substituted phenyl group, a 2,4,6 fluoro (ortho/para) substituted phenyl group, or a 2,3,5,6 (i.e. ortho/meta) fluoro substituted phenyl group; and X is an activatable ligand.

The term "activatable ligand" refers to a ligand which may be activated by a cocatalyst (also referred to as an "activator"), to facilitate olefin polymerization. Examples of activatable ligands X, are independently selected from the group consisting of a hydrogen atom; a halogen atom; a C$_{1-10}$ hydrocarbyl radical; a C$_{1-10}$ alkoxy radical; a C$_{5-10}$ aryl oxide radical, each of which said hydrocarbyl, alkoxy, and aryl oxide radicals may be unsubstituted by or further substituted by a halogen atom, a C$_{1-8}$ alkyl radical, a C$_{1-8}$ alkoxy radical, a C$_{6-10}$ aryl or aryloxy radical; an amido radical which is unsubstituted or substituted by up to two C$_{1-8}$ alkyl radicals; and a phosphido radical which is unsubstituted or substituted by up to two C$_{1-8}$ alkyl radicals. Two activatable X ligands may also be joined to one another and form for example, a substituted or unsubstituted diene ligand (i.e. 1,3-diene); or a delocalized heteroatom containing group such as an acetate group.

The number of activatable ligands depends upon the valency of the metal and the valency of the activatable ligand. The preferred phosphinimine catalysts are based on group 4 metals in their highest oxidation state (i.e. 4$^+$). Particularly suitable activatable ligands are monoanionic such as a halide (e.g. chloride) or a hydrocarbyl (e.g. methyl, benzyl).

In some instances, the metal of the phosphinimine catalyst may not be in the highest oxidation state. For example, a titanium (III) component would contain only one activatable ligand.

In an embodiment of the invention, the phosphinimine catalyst contains a phosphinimine ligand, a perfluoroaryl substituted cyclopentadienyl ligand and two chloride or two methyl ligands bonded to the group 4 metal.

In an embodiment of the invention, the phosphinimine catalyst contains a phosphinimine ligand, a perfluoroarylbenzyl (e.g. C$_6$F$_5$CH$_2$—) substituted cyclopentadienyl ligand and two chloride or two methyl ligands bonded to the group 4 metal.

In an embodiment of the invention, the phosphinimine catalyst contains a phosphinimine ligand, a perfluoroarylbenzyl (e.g. $C_6F_5CH_2$—) substituted indenyl ligand and two chloride or two methyl ligands bonded to the group 4 metal. In another embodiment of the invention, the phosphinimine catalyst contains a phosphinimine ligand; an indenyl ligand substituted at the 1-position, where the substituent at the 1-position is a perfluoroarylbenzyl ($C_6F_5CH_2$—) group; and two chloride or two methyl ligands bonded to the group 4 metal.

In another embodiment of the invention, the phosphinimine catalyst will have the formula: $(1,2-(R^*)(Ar—F)C_5H_3)Ti(N=P(t-Bu)_3)X_2$ where $R^*$ is a hydrocarbyl group; Ar—F is a perfluorinated aryl group, a 2,6 (i.e. ortho) fluoro substituted phenyl group, a 2,4,6 fluoro (ortho/para) substituted phenyl group or a 2,3,5,6 (i.e. ortho/meta) fluoro substituted phenyl group; and X is an activatable ligand.

In another embodiment of the invention, the phosphinimine catalysts will have the formula: $((Ar—F)C_5H_4)Ti(N=P(t-Bu)_3)X_2$ where Ar—F is a perfluorinated aryl group, a 2,6 (i.e. ortho) fluoro substituted phenyl group, a 2,4,6 fluoro (ortho/para) substituted phenyl group or a 2,3,5,6 (i.e. ortho/meta) fluoro substituted phenyl group; and X is an activatable ligand.

In an embodiment of the invention, the phosphinimine catalyst contains a phosphinimine ligand, a perfluorophenyl substituted cyclopentadienyl ligand (i.e. Cp-$CF_5$) and two chloride or two methyl ligands bonded to the group 4 metal.

In an embodiment of the invention, the phosphinimine catalyst contains a 1,2-substituted cyclopentadienyl ligand and a phosphinimine ligand which is substituted by three tertiary butyl substituents.

In an embodiment of the invention, the phosphinimine catalyst contains a 1,2 substituted cyclopentadienyl ligand (e.g. a 1,2-$(R^*)$(Ar—F)Cp) where the substituents are selected from $R^*$ a hydrocarbyl group, and Ar—F a perfluorinated aryl group, a 2,6 (i.e. ortho) fluoro substituted phenyl group, a 2,4,6 fluoro (ortho/para) substituted phenyl group or a 2,3,5,6 (i.e. ortho/meta) fluoro substituted phenyl group respectively.

In the present invention, 1,2 substituted cyclopentadienyl ligands such as for example 1,2-$(R^*)$(Ar—F)Cp ligands may contain as impurities 1,3 substituted analogues such as for example 1,3-$(R^*)$(Ar—F)Cp ligands. Hence, phosphinimine catalysts having a 1,2 substituted Cp ligand may contain as an impurity, a phosphinimine catalyst having a 1,3 substituted Cp ligand. Alternatively, the current invention contemplates the use of 1,3 substituted Cp ligands as well as the use of mixtures of varying amounts of 1,2 and 1,3 substituted Cp ligands to give phosphinimine catalysts having 1,3 substituted Cp ligands or mixed phosphinimine catalysts having 1,2 and 1,3 substituted Cp ligands.

In an embodiment of the invention, the phosphinimine catalyst has the formula: $(1,2-(R^*)(Ar—F)Cp)M(N=P(t-Bu)_3)X_2$ where $R^*$ is a hydrocarbyl group; Ar—F is a perfluorinated aryl group, a 2,6 (i.e. ortho) fluoro substituted phenyl group, a 2,4,6 fluoro (ortho/para) substituted phenyl group or a 2,3,5,6 (i.e. ortho/meta) fluoro substituted phenyl group; M is Ti, Zr or Hf; and X is an activatable ligand. In an embodiment of the invention, the phosphinimine catalyst has the formula: $(1,2-(R^*)(Ar—F)Cp)M(N=P(t-Bu)_3)X_2$ where $R^*$ is an alkyl group; Ar—F is a perfluorinated aryl group, a 2,6 (i.e. ortho) fluoro substituted phenyl group, a 2,4,6 fluoro (ortho/para) substituted phenyl group or a 2,3,5,6 (i.e. ortho/meta) fluoro substituted phenyl group; M is Ti, Zr or Hf; and X is an activatable ligand. In an embodiment of the invention, the phosphinimine catalyst has the formula: $(1,2-(R^*)(Ar—F)Cp)M(N=P(t-Bu)_3)X_2$ where $R^*$ is a hydrocarbyl group having from 1 to 20 carbons; Ar—F is a perfluorinated aryl group, a 2,6 (i.e. ortho) fluoro substituted phenyl group, a 2,4,6 fluoro (ortho/para) substituted phenyl group or a 2,3,5,6 (i.e. ortho/meta) fluoro substituted phenyl group; M is Ti, Zr or Hf; and X is an activatable ligand. In an embodiment of the invention, the phosphinimine catalyst has the formula: $(1,2-(R^*)(Ar—F)Cp)M(N=P(t-Bu)_3)X_2$ where $R^*$ is a hydrocarbyl group having from 1 to 20 carbons; Ar—F is a perfluorinated aryl group; M is Ti, Zr or Hf; and X is an activatable ligand. In an embodiment of the invention, the phosphinimine catalyst has the formula: $(1,2-(n-R^*)(Ar—F)Cp)M(N=P(t-Bu)_3)X_2$ where $R^*$ is a straight chain alkyl group; Ar—F is a perfluorinated aryl group; M is Ti, Zr or Hf; and X is an activatable ligand. In an embodiment of the invention, the phosphinimine catalyst has the formula: $(1,2-(R^*)(C_6F_5)Cp)M(N=P(t-Bu)_3)X_2$ where $R^*$ is a hydrocarbyl group having 1 to 20 carbon atoms; M is Ti, Zr or Hf; and X is an activatable ligand. In an embodiment of the invention, the phosphinimine catalyst has the formula: $(1,2-(n-R^*)(C_6F_5)Cp)M(N=P(t-Bu)_3)X_2$ where $R^*$ is a straight chain alkyl group; M is Ti, Zr or Hf; and X is an activatable ligand. In further embodiments, M is Ti and $R^*$ is selected from the group consisting of n-propyl, n-butyl and n-hexyl, and X is selected from chloride or methide.

The term "perfluorinated aryl group" means that each hydrogen atom attached to a carbon atom in an aryl group has been replaced with a fluorine atom as is well understood in the art (e.g. a perfluorinated phenyl group or substituent has the formula —$C_6F_5$). In embodiments of the invention, Ar—F is selected from the group comprising perfluorinated phenyl or perfluorinated naphthyl groups.

Some phosphinimine catalysts which may be used in the present invention include: $((C_6F_5)Cp)Ti(N=P(t-Bu)_3)Cl_2$, $(1,2-(n-propyl)(C_6F_5)Cp)Ti(N=P(t-Bu)_3)Cl_2$, $(1,2-(n-butyl)(C_6F_5)Cp)Ti(N=P(t-Bu)_3)Cl_2$ and $(1,2-(n-hexyl)(C_6F_5)Cp)Ti(N=P(t-Bu)_3)Cl_2$.

The Cocatalyst

In the present invention, the phosphinimine catalyst is used in combination with at least one activator (or "cocatalyst") to form an active polymerization catalyst system for olefin polymerization. Activators (i.e. cocatalysts) include ionic activator cocatalysts and hydrocarbyl aluminoxane cocatalysts.

The activator used to activate the phosphinimine catalyst can be any suitable activator including one or more activators selected from the group consisting of alkylaluminoxanes and ionic activators, optionally together with an alkylating agent.

The alkylaluminoxanes are complex aluminum compounds of the formula: $R^3_2Al^1O(R^3Al^1O)_mAl^1R^3_2$, wherein each $R^3$ is independently selected from the group consisting of $C_{1-20}$ hydrocarbyl radicals and m is from 3 to 50. Optionally a hindered phenol can be added to the alkylaluminoxane to provide a molar ratio of $Al^1$:hindered phenol of from 2:1 to 5:1 when the hindered phenol is present.

In an embodiment of the invention, $R^3$ of the alkylaluminoxane, is a methyl radical and m is from 10 to 40.

The alkylaluminoxanes are typically used in substantial molar excess compared to the amount of group 4 transition metal in the phosphinimine catalyst. The $Al^1$:group 4 transition metal molar ratios are from 10:1 to 10,000:1, preferably about 30:1 to 500:1.

It is well known in the art, that the alkylaluminoxane can serve dual roles as both an alkylator and an activator. Hence, an alkylaluminoxane activator is often used in combination with activatable ligands such as halogens.

Alternatively, the activator of the present invention may be a combination of an alkylating agent (which may also serve as a scavenger) with an activator capable of ionizing the group 4 metal of the phosphinimine catalyst (i.e. an ionic activator). In this context, the activator can be chosen from one or more alkylaluminoxane and/or an ionic activator.

When present, the alkylating agent may be selected from the group consisting of $(R^4)_pMgX^2_{2-p}$ wherein $X^2$ is a halide and each $R^4$ is independently selected from the group consisting of $C_{1-10}$ alkyl radicals and p is 1 or 2; $R^4$Li wherein in $R^4$ is as defined above, $(R^4)_qZnX^2_{2-q}$ wherein $R^4$ is as defined above, $X^2$ is halogen and q is 1 or 2; $(R^4)_sAl^2X^2_{3-s}$ wherein $R^4$ is as defined above, $X^2$ is halogen and s is an integer from 1 to 3. Preferably in the above compounds $R^4$ is a $C_{1-4}$ alkyl radical, and $X^2$ is chlorine. Commercially available compounds include triethyl aluminum (TEAL), diethyl aluminum chloride (DEAC), dibutyl magnesium ($(Bu)_2Mg$), and butyl ethyl magnesium (BuEtMg or BuMgEt).

The ionic activator may be selected from the group consisting of: (i) compounds of the formula $[R^5]^+ [B(R^6)_4]^-$ wherein B is a boron atom, $R^5$ is a cyclic $C_{5-7}$ aromatic cation or a triphenyl methyl cation and each $R^6$ is independently selected from the group consisting of phenyl radicals which are unsubstituted or substituted with from 3 to 5 substituents selected from the group consisting of a fluorine atom, a $C_{1-4}$ alkyl or alkoxy radical which is unsubstituted or substituted by a fluorine atom; and a silyl radical of the formula —Si—$(R^7)_3$; wherein each $R^7$ is independently selected from the group consisting of a hydrogen atom and a $C_{1-4}$ alkyl radical; and (ii) compounds of the formula $[(R^8)_tZH]^+ [B(R^6)_4]^-$ wherein B is a boron atom, H is a hydrogen atom, Z is a nitrogen atom or phosphorus atom, t is 2 or 3 and $R^8$ is selected from the group consisting of $C_{1-8}$ alkyl radicals, a phenyl radical which is unsubstituted or substituted by up to three $C_{1-4}$ alkyl radicals, or one $R^8$ taken together with a nitrogen atom may form an anilinium radical and $R^6$ is as defined above; and (iii) compounds of the formula $B(R^6)_3$ wherein $R^6$ is as defined above.

In the above compounds preferably $R^6$ is a pentafluorophenyl radical, and $R^5$ is a triphenylmethyl cation, Z is a nitrogen atom and $R^8$ is a $C_{1-4}$ alkyl radical or one $R^8$ taken together with a nitrogen atom forms an anilinium radical (e.g. $PhR^9_2NH^+$, which is substituted by two $R^9$ radicals such as for example two $C_{1-4}$ alkyl radicals).

Examples of compounds capable of ionizing the phosphinimine catalyst include the following compounds: triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tributylammonium tetra(pentafluorophenyl)boron, tripropylammonium tetra (o,p-dimethylphenyl)boron, tributylammonium tetra(m,m-dimethylphenyl) boron, tributylammonium tetra(p-trifluoromethylphenyl) boron, tributylammonium tetra(pentafluorophenyl)boron, tri (n-butyl)ammonium tetra (o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra (phenyl)boron, triphenylphosphonium tetra)phenyl)boron, tri(methylphenyl)phosphonium tetra(phenyl)boron, tri (dimethylphenyl)phosphonium tetra(phenyl)boron, tropillium tetrakispentafluorophenyl borate, triphenylmethylium tetrakispentafluorophenyl borate, benzene (diazonium) tetrakispentafluorophenyl borate, tropillium phenyltris-pentafluorophenyl borate, triphenylmethylium phenyltrispentafluorophenyl borate, benzene (diazonium) phenyltrispentafluorophenyl borate, tropillium tetrakis (2,3,5,6-tetrafluorophenyl) borate, triphenylmethylium tetrakis (2,3,5,6-tetrafluorophenyl) borate, benzene (diazonium) tetrakis (3,4,5-trifluorophenyl) borate, tropillium tetrakis (3,4,5-trifluorophenyl) borate, benzene (diazonium) tetrakis (3,4,5-trifluorophenyl) borate, tropillium tetrakis (1,2,2-trifluoroethenyl) borate, trophenylmethylium tetrakis (1,2,2-trifluoroethenyl) borate, benzene (diazonium) tetrakis (1,2,2-trifluoroethenyl) borate, tropillium tetrakis (2,3,4,5-tetrafluorophenyl) borate, triphenylmethylium tetrakis (2,3,4,5-tetrafluorophenyl) borate, and benzene (diazonium) tetrakis (2,3,4,5-tetrafluorophenyl) borate.

Commercially available activators which are capable of ionizing the group 4 metal of the phosphinimine catalyst include:
N,N-dimethylaniliniumtetrakispentafluorophenyl borate ("$[Me_2NHPh][B(C_6F_5)_4]$");
triphenylmethylium tetrakispentafluorophenyl borate ("$[Ph_3C][B(C_6F_5)_4]$"); and
trispentafluorophenyl boron.

The ionic activators compounds may be used in amounts which provide a molar ratio of group 4 transition metal to boron that will be from 1:1 to 1:6.

Optionally, mixtures of alkylaluminoxanes and ionic activators can be used as activators in the polymerization catalyst.

The Inert Support

In the present invention, the phosphinimine catalyst is supported on an inert support. The support used in the present invention can be any support known in the art to be suitable for use with polymerization catalysts. For example the support can be any porous or non-porous support material, such as talc, inorganic oxides, inorganic chlorides, aluminophosphates (i.e. $AlPO_4$) and polymer supports (e.g. polystyrene, etc). Preferred supports include Group 2, 3, 4, 5, 13 and 14 metal oxides generally, silica, alumina, silica-alumina, magnesium oxide, magnesium chloride, zirconia, titania, clay (e.g. montmorillonite) and mixtures thereof.

Agglomerate supports such as agglomerates of silica and clay may also be used as a support in the current invention.

Supports are generally used in calcined form. An inorganic oxide support, for example, will contain acidic surface hydroxyl groups which will react with a polymerization catalyst. Prior to use, the inorganic oxide may be dehydrated to remove water and to reduce the concentration of surface hydroxyl groups. Calcination or dehydration of a support is well known in the art. In embodiments of the invention, the support is calcined at temperatures above 200° C., or above 300° C., or above, 400° C., or above 500° C. In other embodiments, the support is calcined at from about 500° C. to about 1000° C., or from about 600° C. to about 900° C. The resulting support may be free of adsorbed water and may have a surface hydroxyl content from about 0.1 to 5 mmol/g of support, or from 0.5 to 3 mmol/g. The amount of hydroxyl groups in a silica support may be determined according to the method disclosed by J. B. Peri and A. L. Hensley Jr., in *J. Phys. Chem.*, 72 (8), 1968, pg 2926.

The support material, especially an inorganic oxide, such as silica, typically has a surface area of from about 10 to about 700 $m^2/g$, a pore volume in the range from about 0.1 to about 4.0 cc/g and an average particle size of from about 5 to about 500 µm. In a specific embodiment, the support material has a surface a surface area of from about 50 to about 500 $m^2/g$, a pore volume in the range from about 0.5 to about 3.5 cc/g and an average particle size of from about 10 to about 200 µm. In another specific embodiment the support material has a surface area of from about 100 to about 400 $m^2/g$, a pore volume in the range from about 0.8 to about 3.0 cc/g and an average particle size of from about 5 to about 100 µm.

The support material, especially an inorganic oxide, such as silica, typically has an average pore size (i.e. pore diameter) of from about 10 to about 1000 Angstroms (Å). In a specific embodiment, the support material has an average pore size of from about 50 to about 500 Å. In another specific embodiment, the support material has an average pore size of from about 75 to about 350 Å.

The surface area and pore volume of a support may be determined by nitrogen adsorption according to B.E.T. techniques, which are well known in the art and are described in the *Journal of the American Chemical Society*, 1938, v 60, pg 309-319.

A silica support which is suitable for use in the present invention has a high surface area and is amorphous. By way of example, useful silicas are commercially available under the trademark of Sylopol® 958, 955 and 2408 from Davison Catalysts, a Division of W. R. Grace and Company and ES-70W by PQ Corporation.

Agglomerate supports comprising a clay mineral and an inorganic oxide, may be prepared using a number techniques well known in the art including pelletizing, extrusion, drying or precipitation, spray-drying, shaping into beads in a rotating coating drum, and the like. A nodulization technique may also be used. Methods to make agglomerate supports comprising a clay mineral and an inorganic oxide include spray-drying a slurry of a clay mineral and an inorganic oxide. Methods to make agglomerate supports comprising a clay mineral and an inorganic oxide are disclosed in U.S. Pat. Nos. 6,686,306; 6,399,535; 6,734,131; 6,559,090 and 6,958,375.

An agglomerate of clay and inorganic oxide which may be useful in the current invention may have the following properties: a surface area of from about 20 to about 800 $m^2/g$, preferably from 50 to about 600 $m^2/g$; particles with a bulk density of from about 0.15 to about 1 g/ml, preferably from about 0.20 to about 0.75 g/ml; an average pore diameter of from about 30 to about 300 Angstroms (Å), preferably from about 60 to about 150 Å; a total pore volume of from about 0.10 to about 2.5 cc/g, preferably from about 0.5 to about 1.8 cc/g; and an average particle size of from about 4 to 250 microns (μm), preferably from about 8 to 100 microns.

Optionally, a support, for example a silica support, may be treated with one or more salts of the type: $Zr(SO_4)_2 \cdot 4H_2O$, $ZrO(NO_3)_2$, and $Fe(NO_3)_3$ as taught in CA Patent Application No. 2,716,772 to the same applicant. Supports that have been otherwise chemically treated are also contemplated for use with the catalysts and processes of the present invention.

Without wishing to be bound by theory, $Zr(SO_4)_2 \cdot 4H_2O$ and $ZrO(NO_3)_2$ may each act as a source of zirconium oxide (i.e. $ZrO_2$) which may form for example after calcinations temperatures are employed. Alternately, the $Zr(SO_4)_2 \cdot 4H_2O$ can be used to add $Zr(SO_4)_2$ to an inert support if suitably high calcinations temperatures (those which promote formation of zirconium oxide) are not employed.

The present invention is not limited to any particular procedure for supporting the phosphinimine catalyst or the cocatalyst. Processes for depositing a phosphinimine catalyst complex and/or a cocatalyst on a support are well known in the art (for some non-limiting examples of catalyst supporting methods, see "Supported Catalysts" by James H. Clark and Duncan J. Macquarrie, published online Nov. 15, 2002 in the Kirk-Othmer Encyclopedia of Chemical Technology Copyright© 2001 by John Wiley & Sons, Inc.; for some non-limiting methods to support a single site catalyst see U.S. Pat. No. 5,965,677). For example, the phosphinimine catalyst may be added to a support by co-precipitation with the support material. The cocatalyst can be added to a support before and/or after the phosphinimine catalyst or together with the phosphinimine catalyst (i.e. the phosphinimine catalyst may be mixed with a cocatalyst in a suitable solvent or diluents and the mixture added to a support). Optionally, the cocatalyst can be added to a supported phosphinimine catalyst on route to a reactor. The phosphinimine catalyst and/or cocatalyst may be slurried or dissolved in a suitable diluent or solvent respectively and then added to a support. Suitable solvents or diluents include but are not limited to hydrocarbons and mineral oil. The phosphinimine catalyst may be added to the solid support, in the form of a solid, solution or slurry, followed by the addition of the cocatalyst in solid form or as a solution or slurry. The cocatalyst may be added to the solid support, in the form of a solid, solution or slurry, followed by the addition of the phosphinimine catalyst in solid form or as a solution or slurry. Phosphinimine catalyst, cocatalyst, and support can be mixed together in the presence or absence of a diluent or solvent, but use of diluent(s) or solvent(s) is preferred.

The loading of the phosphinimine catalyst on the support is not specifically defined, but by way of non-limiting example can be from about 0.005 to 1.0, or from about 0.010 to 0.50, or from about 0.015 to 0.40, or from about 0.015 to 0.035 mmol of the phosphinimine catalyst per gram of support. In further embodiments of the invention, the loading of the phosphinimine catalyst on the support may from about 0.020 to 0.031 mmol, or from about 0.025 to 0.0305 mmol of the phosphinimine catalyst per gram of support.

In embodiments of the invention, the phosphinimine catalyst will be added to the inert support so as to give from 0.01 to 10 wt % of Ti, or from 0.05 to 5.0 wt % of Ti, or from 0.05 to 3.0 wt % of Ti, or from 0.10 to 2.0 wt % of Ti based on the combined weight of the phosphinimine catalyst, the inert support and the cocatalyst.

The Catalyst Slurry

As used herein the term "slurry" refers to a mixture which comprises a solid material suspended in a liquid hydrocarbon carrier, preferably a viscous liquid hydrocarbon such as mineral oil. However, less viscous and even relatively volatile liquid hydrocarbons are also contemplated for use in the current invention.

The terms "catalyst slurry" or "polymerization catalyst slurry" as used herein refer to a slurry comprising one or more liquid hydrocarbon carrier(s) and at least one supported polymerization catalyst comprising a phosphinimine catalyst, an inert support and a co-catalyst.

For the supported polymerization catalyst of the present invention, the amount of liquid hydrocarbon carrier required to form a slurry will minimally exceed the pore volume of the support and must be present in amounts which form a flowable slurry (i.e. a suspension of supported catalyst particles in a flowable liquid hydrocarbon) as distinguished from a solid or a powder which may contain lesser amounts of a liquid hydrocarbon (for example, amounts which are slightly greater than or less than the pore volume of the inert support) and which may even be sticky, but which are not flowable slurries.

The supported polymerization catalyst must, in the present invention, be fed to a reactor or reactor system as a slurry in a liquid hydrocarbon, preferably a viscous liquid hydrocarbon such as mineral oil. However, feeding a supported polymerization catalyst as a slurry in less viscous and even relatively volatile liquid hydrocarbons is also contemplated by the current invention.

The liquid hydrocarbon carrier chosen to form a slurry of the supported polymerization catalyst can be any flowable liquid hydrocarbon provided that it be a) inert with respect to the polymerization catalyst and its components, and b) not capable of appreciably extracting or dissolving polymerization catalyst components already present in a supported polymerization catalyst.

The liquid hydrocarbon carrier used in the formation of the catalyst slurry must be inert towards the catalyst. This means that it should not contain components having a tendency to negatively impact the performance of the polymerization catalyst. Groups containing atoms selected from oxygen, sulfur, nitrogen, chlorine, fluorine, bromine, iodine and so on are generally avoided unless they are present in compounds purposely added to the hydrocarbon carrier in order to modify the catalyst or polymerization process (e.g. antistatic agents). Hence, it may be preferably to avoid compounds like water, oxygen, alcohols, organic sulfides, ketones, carbon monoxide, carbon dioxide and acetylenic compounds (it may also be preferably to avoid the presence of compounds containing polymerizable double bonds or triple bonds). Such compounds may be present in less than 100 ppm or less than 50 ppm or less than 10 ppm.

The amount of liquid hydrocarbon carrier used to form a slurry of the supported polymerization catalyst must be sufficient to suspend the supported polymerization catalyst (i.e. to form a suspension of the supported catalyst in the liquid hydrocarbon) and preferably to entrain the supported polymerization catalyst as far as into a polymerization reactor from any suitable liquid hydrocarbon source tank, or any suitable catalyst slurry holding tank or mixing tank, or mixing point During its introduction to a reactor, the supported polymerization catalyst is preferably kept entrained and well dispersed within the liquid hydrocarbon in order to avoid it settling out of the slurry on route to the reactor. Viscous hydrocarbon liquids, which prevent, or at least slow down or attenuate substantial settling out of the supported polymerization catalyst within the slurry are preferred. However, agitation methods or appropriate fluid flows can also be used to keep the supported polymerization catalyst entrained and well dispersed (see for example, U.S. Pat. No. 5,922,818).

The manner in which the catalyst slurry is fed to the reactor is not specifically defined. The catalyst slurry can be fed into a gas phase polymerization reactor using any suitable means known in the art for delivering catalyst slurries (non-limiting examples of catalyst slurry feeding can be found in GB 838, 395, EP 811,638 A2, EP 1,660,231 B1, WO 2004/026455, U.S. Pat. Nos. 3,726,845, 4,610,574, 5,098,667, 6,245,868, 6,617,405, 6,908,971, 7,803,324, 6,936,226, 7,202,313, 7,232,868, 7,494,626, 7,645,843, U.S. Pat. Appl. Nos. 2002/0107342, 2008/0039596 and references within the forgoing). By way of non-limiting example only, the catalyst slurry can be introduced using a pipe connecting a chamber or mixing vessel containing the catalyst slurry to a polymerization reactor. The pipe may terminate in the reactor vessel in any suitable and known nozzle structure the design of which is not specifically defined or limited. Specialized slurry feed equipment is also contemplated for use in the present invention, such as that described in for example U.S. Pat. No. 5,922,818. The slurry can be introduced into a reactor via a pressurized syringe system or other positive displacement device. One such device is a progressive pump such as a Moyno® pump, which can be used for directing slurries of high viscosity (for example a mineral oil slurry) and can do so with high pressure. Positive displacement pumps of this kind can help to deliver catalyst slurry accurately and measurably. The catalyst slurry can in this way be delivered continuously or intermittently to a reactor.

A catalyst slurry can be introduced into the reactor by gravity or preferably by a pressure difference between a chamber holding the catalyst slurry and the reactor. The catalyst slurry can be pushed into the reactor under positive gas pressure or positive fluid pressure.

Catalyst slurry feed systems and catalyst injection tubes such as those described in U.S. Pat. Appl. Nos 2002/0107342 and 2011/0088787 and U.S. Pat. No. 6,956,089 and references therein may also be useful in the present invention. The catalysts slurry feeding systems described in U.S. Pat. Appl. No. 2011/0130531 and references therein may also be useful in the current invention.

The catalyst slurry may be formed by any method known in the art. In an embodiment, the method involves introducing the solid polymerization catalyst to mineral oil or other liquid hydrocarbon under agitation. The slurry may be prepared in a catalyst feed vessel or it may be prepared in advance and then transferred into a catalyst feed vessel. Further, the solid catalyst component may also be delivered into the feed vessel as concentrated slurry, which may then be diluted with further liquid hydrocarbon in the feed vessel.

A homogeneous catalyst slurry may be maintained by agitation. The agitation can be obtained by circulating the slurry by using a circulation pump and pipes connecting the pump to the catalyst feed vessel. Alternatively, the catalyst feed vessel may be equipped with an agitator, which keeps the slurry within the feed vessel in motion. When the slurry comprises a non-viscous hydrocarbon liquid it may be preferable to have the catalyst feed vessel equipped with an agitator. When agitation is desired, the elements of the agitator may be chosen so that uniform stirring in the whole volume of the catalyst feed vessel is obtained without dead spots where the catalyst could settle. These stirrer elements, such as anchor type elements and axial and radial impellers are well known in the art and a person skilled in the art can choose a suitable combination for each geometry of the catalyst feed vessel. The catalyst feed vessel may also be equipped with baffles, which are known in the art to further improve the stirring. Agitation and solid suspension methods are discussed, for example, in Zwietering Th. N., "Suspending of Solids Particles in Liquid by Agitators", Chem Eng Sci, Vol 8, pp 244-254, 1958.

The temperature of the slurry within a catalyst feed vessel is not specifically defined. However, in the case of a mineral oil slurry, temperatures which are too low or too high should be avoided, as otherwise the viscosity of the slurry might either become too high for convenient handling and pumping or so low that the polymerization catalyst particles tend to settle. By way of non-limiting example only, the temperature of the catalyst slurry may range from −30° C. to +80° C. The catalyst feed vessel may be equipped with a heating/cooling jacket so that the temperature in the vessel can be maintained within the desired level.

Temperature variations of the catalyst slurry are preferably avoided as they may cause variations in the density of the slurry. If the density of the slurry varies, then the catalyst feed rate may vary and this could cause fluctuations in the polymerization process.

The pressure within a catalyst slurry feed vessel is not specifically defined. It can be selected within the operating range of the process equipment. The pressure should be such that the slurry feed pumps can be operated without problems.

In an embodiment of the invention, the pressure in the catalyst slurry feed vessel is higher than the atmospheric pressure to minimize leaks of air and/or moisture into the catalyst feed vessel.

A catalyst slurry feed vessel should be maintained under an inert atmosphere. For example the presence of oxygen and moisture should be avoided. Therefore, all the connections to the vessel, such as pipe joints and agitator shaft bearing should be designed to eliminate the leaks from the atmosphere.

In an embodiment of the invention, a gas phase present in a catalyst slurry feed vessel will consist of nitrogen, argon or similar inert gases, or their mixtures. In such an embodiment, the catalyst feed vessel should be designed with the option to flush the vessel with inert gas.

In an embodiment of the invention, a portion of the catalyst slurry is continuously withdrawn from a catalyst slurry feed vessel and introduced into a gas phase polymerization reactor. The slurry may be metered into the reactor by using a metering pump. The metering pump may be any pump that is capable of metering slurries with the specified viscosity in the required amount. One pump that has been found as especially useful in the process of the invention is a valveless piston pump. Examples of such pumps and their use are given in WO 92/16747 and WO 00/47638.

The catalyst slurry feed line may be equipped with a catalyst flow meter. Flow meters suitable for measuring the catalyst feed rate are disclosed in PCT patent application PCT/EP03/15031, or are commercially available, among others, from Oxford Instruments. Such a flow meter may also be used as a part of a control loop to control the catalyst feed rate. For example, a signal from the flow meter is compared with a predetermined set value, and the signal to the metering pump is adjusted based on the difference.

The concentration of the solid polymerization catalyst in the liquid hydrocarbon carrier is generally such that the desired catalyst feed rate can be conveniently obtained. The concentration must not be too high, as otherwise it may be difficult to maintain a stable slurry. On the other hand, if the concentration is too low it may result in using an excessive amount of hydrocarbon liquid, which in the case of mineral oil may cause problems by increasing the level of extractable material in the final polymer product. Suitable catalyst concentrations can be determined by routine experiment, but by way of non-limiting example, can be from 10 to 300 kg of catalyst per $m^3$ of liquid hydrocarbon carrier, or from 20 to 200 kg of catalyst per $m^3$ of liquid hydrocarbon carrier, or from 25 to 100 kg of catalyst per $m^3$ of liquid hydrocarbon carrier.

The (olefin) polymerization catalyst components, which minimally include at least one phosphinimine catalyst, at least one support, and at least one cocatalyst, may be combined prior to their addition to a polymerization zone, or they may be combined on route to a polymerization zone, so long as the polymerization catalyst is suspended in liquid hydrocarbon carrier to form a slurry prior to entry to a reactor or reaction zone.

A gas-phase polymerization reactor generally contains an agitated and/or preferably fluidized bed, the bed being composed essentially of particles of catalyst and of polymer in the course of formation. The catalyst slurry is preferably introduced directly into the bed, although other entry points may also be used. For example, in a fluidized bed reactor which generally comprises a vertical cylinder equipped at its base with a fluidization grid, the catalyst slurry is directly introduced into the fluidized bed at a point located above the fluidization grid and below the top of the bed.

In an embodiment of the invention, the liquid hydrocarbon carrier is relatively non-viscous relative to a mineral oil at the same temperature and pressure conditions. Suitable, relatively non-viscous liquid hydrocarbon carriers are saturated hydrocarbon having from 2 to 10 carbon atoms. Non-limiting examples of suitable non-viscous liquid hydrocarbons include $C_2$ to $C_8$ hydrocarbons, such as one or a number of alkanes or cycloalkanes, more preferably a $C_2$ to $C_8$ alkane, and most preferably a $C_3$ to $C_7$ alkane. Specific non-limiting examples of suitable liquid hydrocarbons that may be used to form the catalyst slurry include n-butane, isobutane n-pentane, isopentane, neopentane, n-hexane, isohexane, other saturated $C_6$ hydrocarbons, n-heptane, other saturated $C_7$ hydrocarbons, n-octane, other saturated $C_8$ hydrocarbons, and mixtures of the forgoing.

Substituted alkanes are also contemplated for use as liquid hydrocarbon carriers. These may include for example Isopar C and/or other substituted liquid hydrocarbons. The present invention also contemplates the use of a liquid hydrocarbon having aromatic moieties, so long as the aromatic containing hydrocarbon has little or no effect on the catalyst performance. However where polymer products are to be used in food contact applications, the use or aromatics is less preferred.

In an embodiment of the invention, the liquid hydrocarbon carrier used to form a slurry is a relatively volatile liquid in the presence of the polymerization conditions used in a gas-phase reactor and in particular in a fluidized bed gas phase reactor. For example, the particular liquid hydrocarbon used to form the catalyst slurry, can instantaneously or very quickly evaporate as soon as it enters into a gas phase reactor (e.g. a fluidized bed reactor). More specifically, the liquid hydrocarbon used to form the catalyst slurry can instantaneously or very quickly evaporate in the region of a fluidized bed reactor where the temperature is substantially constant and highest. Such volatile liquid hydrocarbon may include for example isopentane, pentane, n-butane, isobutane, propane, or any other liquid hydrocarbon which becomes gaseous under the conditions of the gas phase polymerization process.

In an embodiment of the invention, the liquid hydrocarbon carrier used to form the catalyst slurry is relatively viscous liquid hydrocarbon such as for example mineral oil.

The viscosity of the viscous liquid hydrocarbon carrier should be such that a stable catalyst slurry is formed with minimal tendency of the supported catalyst particles to settle. Therefore the viscosity of the viscous liquid hydrocarbon should not be too low. In addition, it is be preferable that the catalyst slurry remain transportable (e.g. flowable) into the polymerization reactor using available feeding equipment. A very high viscosity may cause problems in handling the catalyst slurry and may require specialized high pressure equipment to feed the catalyst slurry to the reactor.

In embodiments of the invention, the liquid hydrocarbon carrier will have at the temperature of the catalyst feeding equipment and vessels a dynamic viscosity of from 20 to 300 cP (centi-Poisse) or from 30 to 200 cP, or from 40 to 100 cP as measured by a Brookfield viscometer at a shear rate of 1 $sec^{-1}$ at 25° C.

In embodiments of the invention, the liquid hydrocarbon carrier comprises a mineral oil having a dynamic viscosity of about 130 to 2000 cP at 20° C., or about 180 to 1500 cP at 20° C., or about 200 to 800 cP at 20° C., as measured with a Brookfield model LVDV-III Rheometer.

In an embodiment of the invention, the liquid hydrocarbon carrier is a hydrocarbon oil, containing less than 100 parts per million (ppm) of compounds containing reactive functional groups. Preferably, the content of such compounds is less than 50 ppm or less than 10 ppm.

In an embodiment of the invention, the catalyst slurry comprises a liquid hydrocarbon in which the supported catalyst will not significantly settle out in less than about 5 minutes in the absence of agitation. A high viscosity liquid hydrocarbon such as a mineral oil is used in the preferred embodiment of the invention.

In embodiments of the invention, the liquid hydrocarbon carrier comprises at least one mineral oil which has at 40° C. a dynamic viscosity of at least 30 centiPoises (cP), or at least 40 cP, or at least 50 cP, or at least 60 cP.

In embodiments of the invention, the mineral oil has a dynamic viscosity of at least 40 centiPoises (cP) at 40° C. or a kinematic viscosity of a least 40 centistokes (cSt) at 40° C.

The term "mineral oil" as used herein refers to petroleum hydrocarbons and mixtures of hydrocarbons that may include aliphatic, naphthenic, aromatic, and/or paraffinic components that are viscous liquids at 23° C.

There are three basic classes of refined mineral oils including paraffinic oils based on n-alkanes; naphthenic oils based on cycloalkanes; and aromatic oil based on aromatic hydrocarbons. Mineral oils are generally a liquid by-product of the distillation of petroleum to produce gasoline and other petroleum based products from crude oil. Hence, mineral oils may be, for example, light, medium or heavy oils coming from the distillation of coal tars or oils obtained during the fractional distillation of petroleum. Mineral oil obtained from petroleum sources (i.e. as a distillate product) will have a paraffinic content, naphthenic content and aromatic content that will depend on the particular type of petroleum used as a source material.

Mineral oils may have a molecular weight of at least 300 amu to 500 amu or more, and a kinematic viscosity at 40° C. of from 40 to 300 centistokes (cSt, note: 1 cSt=1 mm$^2$/s) or greater. In an embodiment of the invention, the mineral oil has a kinematic viscosity of 40 to 200 cSt at 40° C. In an embodiment of the invention, the mineral oil has a kinematic viscosity of 50 to 200 cSt at 40° C.

A mineral oil may be a transparent, colourless oil composed mainly of alkanes (typically 15 to 40 carbons) and cyclic paraffins related to petroleum jelly.

Mineral oils may be oils which are hydrocarbon mixtures distilling from about 225° C. to about 400° C. Typical examples of such mineral oils are the ONDINA® 15 to 68 oils sold by Shell or their equivalents.

In the present invention, the term "mineral oil" includes synthetic oils and other commercial oils such as paraffin oils sold under such names as KAYDOL™ (or White Mineral Oil), ISOPAR™, STRUKTOL™, SUNPAR™ oils, PARAPOL™ oils, and other synthetic oils, refined naphthenic hydrocarbons, and refined paraffins known in the art.

Further examples of suitable oils are mineral oils and synthetic oils comprising essentially of hydrocarbons containing from about 15 to about 50 carbon atoms; Synton PAO 100™, which is a synthetic oil supplied by Crompton Petroleum Additives; Shell Cassida HF 15™, Shell Cassida HF 32™, Shell Cassida 46™, Shell Cassida HF 68™ and Shell Cassida HF 100™, which are synthetic oils supplied by Shell; Drakeol 35™, which is a synthetic oil supplied by Penreco; Ondina 68™, which is a mineral oil supplied by Shell and Primol 352™, which is supplied by ExxonMobil.

Preferably the mineral oil is substantially free of impurities which may negatively affect the catalyst activity or performance. Hence, it is preferably to use relatively pure mineral oil (i.e. greater than 95 percent pure or greater than 99 percent pure). Suitable mineral oils include Kaydol™, Hydrobrite 550™, and Hydrobridte 1000™ available from Crompton Chemical Corporation.

In an embodiment of the invention, the mineral oil is a hydrocarbon mineral oil which is viscous and comprises primarily aliphatic hydrocarbons oils.

In an embodiment of the invention, the mineral oil is non-volatile at ambient conditions (i.e. at least 80% by weight of the mineral oil should have an initial boiling point of at least 300° C. at ambient (i.e. atmospheric) pressure).

In an embodiment of the invention, the mineral oil is mainly paraffinic/naphthenic in nature (i.e. less than 30% by weight of the mineral oil is aromatic in nature).

In an embodiment of the invention, the mineral oil is selected from Kaydol, Shellflex 371 and Tufflo 6000 series paraffinic/naphthenic mineral oils.

In an embodiment of the invention, the mineral oil has a dynamic viscosity at 40° C. of at least 40 centiPoise (cP). In an embodiment of the invention, the mineral oil has a dynamic viscosity at 40° C. of at least 45 centiPoise (cP). In an embodiment of the invention, the mineral oil has a dynamic viscosity at 40° C. of at least 50 centiPoise (cP).

In embodiments of the invention, the mineral oil has a dynamic viscosity at 40° C. of from 30 to 90 centiPoise (cP), or from 40 to 80 cP, or from 45 to 80 cP, or from 40 to 70 cP, or from 50 to 90 cP, or from 50 to 80 cP, or from 50 to 70 cP.

In an embodiment of the invention, the mineral oil is a Kaydol mineral oil.

In an embodiment of the invention, a catalyst slurry in Kaydol mineral oil is contained in a reservoir and constantly stirred to prevent particle settlement. A stream of the catalyst slurry is then metered from the reservoir into a feeding line by a syringe pump and then pushed into a reactor by high pressure nitrogen.

In an embodiment of the invention, a catalyst slurry in Kaydol mineral oil is contained in a reservoir and the slurry is constantly recycled through a loop by a pump to prevent particle settlement. A stream of the catalyst slurry is then metered from the loop into a feeding line by a pump and then pushed into a reactor by high pressure nitrogen.

The mineral oil used in the present invention may also be a mixture or blend of two or more mineral oils in various concentrations.

In an embodiment of the invention, the liquid hydrocarbon carrier used to form the catalyst slurry is a mixture of at least one mineral oil and at least one non-viscous liquid hydrocarbon.

In an embodiment of the invention, the liquid hydrocarbon carrier used to form the catalyst slurry is a mixture of at least one mineral oil and at least one volatile liquid hydrocarbon.

The methods for combining mineral oil with the supported polymerization catalyst are not limited, but one convenient way to combine a mineral oil with the polymerization catalyst is to combine them in suitable hydrocarbon diluents. Without wishing to be bound by theory the use of hydrocarbon diluent(s) may assist the mineral oil in penetrating the pores of the catalyst support. As used herein, the term "hydrocarbon diluent(s)" is meant to include any suitable hydrocarbon diluents other than mineral oils. For example, n-pentane, isopentane, n-hexane, benzene, toluene, xylene, cyclohexane, isobutane and the like can be used as a hydrocarbon diluent. One or more hydrocarbon diluents may be used. A mixture of hydrocarbon diluent(s) and mineral oil may be added to a dry catalyst powder (e.g. the supported polymerization catalyst) or to a catalyst powder slurried in a suitable diluent. Stirring or other agitation may be used. Alternatively, a dry catalyst (e.g. the supported polymerization catalyst) powder may be added to a mineral oil or a mineral oil/hydrocarbon diluent mixture, either directly or as a slurry in suitable hydrocarbon diluents(s). When the polymerization catalyst and the mineral oil are combined in the presence of hydrocarbon diluents(s), the hydrocarbon diluents(s) may be removed or optionally maintained. When removed, diluent(s) can be removed by using one or more steps selected from washing, filtration and evaporation steps, so long as a catalyst slurry is the end result.

Mineral oil may also be added directly to a dry catalyst powder (e.g. the polymerization catalyst) or vice versa which may optionally be washed with hydrocarbon diluent(s). The oil may also be sprayed onto the dry catalyst powder or the mineral oil may be stirred/tumbled with the dry catalyst powder.

It is preferable to take a pre-made supported polymerization catalyst and treat it with mineral oil either directly or in the presence of hydrocarbon diluent(s), although the addition of mineral oil to a support material before the phosphinimine catalyst (or optional co-catalyst) is added is also contemplated and may be useful in some embodiments of the invention. For example, a mineral oil solution or suspension in a suitable hydrocarbon diluent may be combined with the polymerization catalyst followed by the removal of the hydrocarbon diluent using well known methods. Such a technique would be suitable for plant scale processes and may employ one or more mixing tanks, and one or more solvent/diluent removal steps.

In an embodiment of the invention, the mineral oil is added to a pre-made supported polymerization catalyst either directly or in the presence of hydrocarbon diluents.

In an embodiment of the invention, a blend of a mineral oil and liquid hydrocarbon diluent selected from the group consisting of $C_1$ to $C_{10}$ alkanes, $C_6$ to $C_{20}$ aromatic hydrocarbons, $C_7$ to $C_{21}$ alkyl-substituted hydrocarbons, and mixtures thereof is added to a supported polymerization catalyst followed by removal of the hydrocarbon diluent to give a catalyst slurry in mineral oil. In another embodiment, a mineral oil and hydrocarbon diluent selected from the group consisting of $C_1$ to $C_{10}$ alkanes, $C_6$ to $C_{20}$ aromatic hydrocarbons, $C_7$ to $C_{21}$ alkyl-substituted hydrocarbons, and mixtures thereof is added to a supported polymerization catalyst followed by removal of the hydrocarbon diluents to give a catalyst slurry in mineral oil.

Removal of hydrocarbon diluents by evaporation/drying is well known, but preferably the evaporation is carried out under conditions which do not adversely affect the performance of the polymerization catalyst. Removal of hydrocarbon diluents can be carried out under ambient pressures or reduced pressures. Removal of hydrocarbon diluents can be achieved under ambient temperatures or elevated temperatures, provided that elevated temperatures do not lead to catalyst deactivation or catalyst particle agglomeration/sticking. Hydrocarbon diluents may in some circumstances (i.e. for low boiling hydrocarbons) be "blown off" using an inert gas.

When the mineral oil is blended with a suitable hydrocarbon diluent, the diluents(s)-mineral oil mixture may comprise from 1 to 99 wt %, by weight of mineral oil, preferably at least 5 or at least 10 or at least 15 wt % of mineral oil.

In an embodiment of the invention, the solids content in a mineral oil catalyst slurry fed to a reactor will be from about 1 to 35 weight percent (based on the entire weight of the catalyst slurry). In an embodiment of the invention, the solids content in a mineral oil catalyst slurry fed to a reactor will be from about 10 to 30 weight percent. In an embodiment of the invention, the solids content in a mineral oil catalyst slurry fed to a reactor will be from about 15 to 25 weight percent. In an embodiment of the invention, the solids content in a mineral oil catalyst slurry fed to a reactor will be from about 5 to 25 weight percent. In an embodiment of the invention, the solids content in a mineral oil catalyst slurry fed to a reactor will be from about 5 to 20 weight percent. In an embodiment of the invention, the solids content in a mineral oil catalyst slurry fed to a reactor will be from about 5 to 15 weight percent. In an embodiment of the invention, the solids content in a mineral oil catalyst slurry fed to a reactor will be from about 5 to 10 weight percent. In an embodiment of the invention, the solids content in a mineral oil catalyst slurry fed to a reactor will be from about 1 to 10 weight percent.

In an embodiment of the invention, in a mineral oil catalyst slurry fed to a reactor, the mineral oil will be present in at least about 60 weight percent based on the entire weight of the catalyst slurry.

In an embodiment of the invention, in a mineral oil catalyst slurry fed to a reactor, the mineral oil will be present in at least about 70 weight percent based on the entire weight of the catalyst slurry.

In an embodiment of the invention, in a mineral oil catalyst slurry fed to a reactor, the mineral oil will be present in at least about 75 weight percent based on the entire weight of the catalyst slurry.

In an embodiment of the invention, in a mineral oil catalyst slurry fed to a reactor, the mineral oil will be present in at least about 85 weight percent based on the entire weight of the catalyst slurry.

In an embodiment of the invention, in a mineral oil catalyst slurry fed to a reactor, the mineral oil will be present in at least about 90 weight percent based on the entire weight of the catalyst slurry.

In an embodiment of the invention, in a mineral oil catalyst slurry fed to a reactor, the mineral oil will be present in at least about 65 to 95 weight percent based on the entire weight of the catalyst slurry.

In an embodiment of the invention, in a mineral oil catalyst slurry fed to a reactor, the mineral oil will be present in at least about 70 to 95 weight percent based on the entire weight of the catalyst slurry.

In an embodiment of the invention, in a mineral oil catalyst slurry fed to a reactor, the mineral oil will be present in at least about 75 to 95 weight percent based on the entire weight of the catalyst slurry.

In an embodiment of the invention, in a mineral oil catalyst slurry fed to a reactor, the mineral oil will be present in at least about 75 to 99 weight percent based on the entire weight of the catalyst slurry.

In an embodiment of the invention, in a mineral oil catalyst slurry fed to a reactor, the mineral oil will be present in at least about 80 to 99 weight percent based on the entire weight of the catalyst slurry.

In an embodiment of the invention, in a mineral oil catalyst slurry fed to a reactor, the mineral oil will be present in at least about 85 to 99 weight percent based on the entire weight of the catalyst slurry.

In an embodiment of the invention, in a mineral oil catalyst slurry fed to a reactor, the mineral oil will be present in at least about 90 to 99 weight percent based on the entire weight of the catalyst slurry.

In an embodiment of the invention, the liquid hydrocarbon carrier used to form the catalyst slurry is a mixture of a hydrocarbon wax and one or more of a mineral oil, a non-viscous liquid hydrocarbon, or a volatile liquid hydrocarbon.

In an embodiment of the invention, the liquid hydrocarbon carrier used to form the catalyst slurry is a mixture of a hydrocarbon wax and a non-viscous or volatile liquid hydrocarbon.

In an embodiment of the invention, the liquid hydrocarbon carrier used to form the catalyst slurry is a mixture of a hydrocarbon polymer and one or more of a mineral oil, a non-viscous liquid hydrocarbon, or a volatile liquid hydrocarbon.

In an embodiment of the invention, the liquid hydrocarbon carrier used to form the catalyst slurry is a mixture of a hydrocarbon polymer and a non-viscous or volatile liquid hydrocarbon.

Suitable hydrocarbon waxes and hydrocarbon polymers are organic materials that are i) essentially un-reactive toward the polymerization catalyst or individual polymerization catalyst components during preparation of the catalyst slurry or during polymerization with the polymerization catalyst and are ii) composed of at least 85% by weight of hydrogen and carbon.

In an embodiment of the invention, the hydrocarbon polymer is a low molecular weight partially crystalline polyolefin such as a polyethylene or polypropylene or an ethylene/propylene copolymer optionally with another monomer having up to 20 carbon atoms.

In another embodiment of the invention, the hydrocarbon polymer is a low molecular weight polymer of styrene or p-methylstyrene or other substituted styrenes or copolymers thereof including copolymers with at least one other comonomer having up to 20 carbon atoms.

In another embodiment of the invention, the hydrocarbon polymer is polyisobutene.

In an embodiment of the invention, the hydrocarbon wax is a low molecular weight olefin polymer selected from the group comprising polyethylene wax and atactic polypropylene wax.

Further non-limiting examples of hydrocarbon polymers and waxes that may be used in combination with a mineral oil or a non-viscous or volatile hydrocarbon liquid are disclosed in WO 96/34020, Eur. Pat. Nos. 798,315 and 924,226, and U.S. Pat. Nos. 6,703,458, 6,872,682, 5,641,721, 5,385,992 and 7,005,398.

In an embodiment of the invention, the liquid hydrocarbon carrier is further treated with or includes a scavenger prior to (or after) combination with the polymerization catalyst.

In an embodiment of the invention, the liquid hydrocarbon carrier used to form a catalyst slurry is at least one mineral oil which has been treated with or includes a scavenger.

In an embodiment of the invention, the liquid hydrocarbon carrier used to form a catalyst slurry is a mixture of at least one mineral oil and at least one non-viscous liquid hydrocarbon which has been treated with or includes a scavenger.

In an embodiment of the invention, the liquid hydrocarbon carrier used to form a catalyst slurry is a mixture of at least one mineral oil and at least one volatile liquid hydrocarbon which has been treated with or includes a scavenger.

The scavenger can be any substance which consumes or deactivates trace impurities or poisons and which adversely affect the activity of the polymerization catalyst. Suitable scavengers are well known and include organometallic compounds, such as but not limited to organoaluminum compounds having the formula:

where $(X^5)$ is a hydrocarbyl having from 1 to about 20 carbon atoms; $(X^6)$ is selected from alkoxide or aryloxide, any one of which having from 1 to about 20 carbon atoms; halide; or hydride; and n is a number from 1 to 3, inclusive; or alkylaluminoxanes having the formula:

wherein each $R^{30}$ is independently selected from the group consisting of $C_{1-20}$ hydrocarbyl radicals and m is from 3 to 50. Preferred scavengers are trialkylaluminum compounds and include triisobutylaluminum, and triethylaluminum.

An antistatic agent may be added to the polymerization catalyst, to the reactor or both. Alternatively, an antistatic agent may be combined with the catalyst slurry before it is fed to a reactor. The antistatic agent may be added to the catalyst slurry during formulation of the catalyst slurry (e.g. it can be added to a mineral oil or other liquid hydrocarbon carrier before or after the polymerization catalyst or one or more polymerization catalyst components) or it may added to the catalyst slurry on route to a polymerization reactor or within a holding vessel or tank.

In an embodiment of the invention, the liquid hydrocarbon carrier contains an amount of antistatic agent which provides from 1 to 100 ppm, or from 1 to 75 ppm, or from 5 to 50 ppm, or from 5 to 30 ppm, or from 5 to 25 ppm, or from 1 to 25 ppm of antistatic agent based on the weight of the polymer produced in a gas-phase polymerization reactor.

The types of antistatic agents which can be used in the present invention are not specifically defined and can include any of those recognized in the prior art to be usefully applied in gas-phase polymerization. Antistatic agents are also recognized in the art by the term "continuity additive" or "catalyst modifier". Generally speaking a "continuity additive" is a substance or a mixture of substances which, when present in appropriate amounts, can reduce, prevent or mitigate at least one of fouling, sheeting, and static level of a material in polymerization reactor.

Some non-limiting examples of continuity additives or antistatic agents are alkoxylated amines (also known as alkanolamines, see European Patent No. 811,638 and U.S. Pat. Nos. 6,140,432; 6,124,230; 6,114,479 for examples), carboxylate metal salts (see U.S. Pat. Nos. 7,354,880; 6,300, 436; 6,306,984; 6,391,819; 6,472,342 and 6,608,153 for examples), polysulfones, polymeric polyamines and sulfonic acids (see U.S. Pat. Nos. 6,562,924; 6,022,935 and 5,283,278 for examples). Other possible continuity additives are described in European Pat. Appl. No. 107,127, including polyoxyethylenealkylamines.

Specific examples of alkoxylated amines which may be used in the present invention are Kemamine AS-990™, ARMOSTAT 1800™, and ATMER-163™ which are available from one or more of Ciba, BASF, Akzo-Nobel, Croda Canada Ltd, or Witco Chemical Company. Other suitable continuity additives include aluminum stearate and aluminum oleate. Still other specific continuity additives are supplied commercially under the trademarks OCTASTAT™ and STADIS™. The continuity additive STADIS is described in U.S. Pat. Nos. 7,476,715; 6,562,924 and 5,026,795 and is available from Octel Starreon or Innospec Fuel Specialitis. STADIS generally comprises a polysulfone copolymer, a polymeric amine and an oil soluble sulfonic acid.

In an embodiment of the invention, an antistatic agent is fed to a gas phase reactor separately from the catalyst slurry. The antistatic agent can be fed to the reactor in neat form or as a solution or slurry in a solvent or diluent respectively. The antistatic agent may be a solid or a liquid.

In an embodiment of the invention, an antistatic agent is fed to a gas phase reactor in a catalyst slurry which further comprises the antistatic agent.

The catalyst slurry may contain additional components, such as drag reducing reagents. If such components are used, they may be combined with the catalyst slurry in a slurry vessel, or they may be combined with the catalyst slurry on route to a reactor.

Such drag reducing agents are typically soluble polymers of high alpha-olefins, like $C_6$ to $C_{15}$ alpha-olefins, preferably $C_8$ to $C_{13}$ alpha-olefins, and their mixtures. They may comprise a minor amount of comonomer units derived from other olefins as well. It is important, however, that the drag reducing agent is soluble in the liquid hydrocarbon carrier. The drag reducing agent may be used in an amount of from 0.1 to 1000 ppm, preferably from 0.5 to 100 ppm and more preferably from 1 to 50 ppm by weight of the catalyst slurry. When considering the added amount of a drag reducing agent, it should be borne in mind that the drag reducing agent will remain within the polymer product and may have a negative effect on product properties if used in too large an amount.

Without wishing to be bound by theory, when a drag reducing agent is added to the catalyst slurry, it delays the settling process and prevents the catalyst particles from agglomerating. For this reason, the drag reducing agent can be advantageously used to improve the transport and storage stability of the slurry. If the catalyst is to be transported and stored in slurry, the drag reducing agent may be added into the slurry when it is loaded into transportation drums. In this way sedimentation of the catalyst during transport and storage can be avoided. The addition of the drag reducing agent is especially useful when transporting, storing and feeding solid catalyst components having a small particle size.

For examples of drag reducing agents which may be used in the current invention see U.S. Pat. No. 7,645,843 which is incorporated herein in its entirety.

The Polymerization Process

Olefin polymerization processes which are compatible with the current invention include gas phase, slurry phase and combined gas phase/slurry phase polymerization processes, with gas phase processes being preferred. Preferably, ethylene copolymerization with an alpha-olefin is carried out in the gas phase, in for example at least one fluidized bed reactor.

Detailed descriptions of slurry polymerization processes are widely reported in the patent literature. For example, particle form polymerization, or a slurry process where the temperature is kept below the temperature at which the polymer goes into solution is described in U.S. Pat. No. 3,248,179. Slurry processes include those employing a loop reactor and those utilizing a single stirred reactor or a plurality of stirred reactors in series, parallel, or combinations thereof. Non-limiting examples of slurry processes include continuous loop or stirred tank processes. Further examples of slurry processes are described in U.S. Pat. No. 4,613,484.

Slurry processes are conducted in the presence of a hydrocarbon diluent such as an alkane (including isoalkanes), an aromatic or a cycloalkane. The diluent may also be the alpha olefin comonomer used in copolymerizations. Alkane diluents include propane, butanes, (i.e. normal butane and/or isobutane), pentanes, hexanes, heptanes and octanes. The monomers may be soluble in (or miscible with) the diluent, but the polymer is not (under polymerization conditions). The polymerization temperature is preferably from about 5° C. to about 200° C., most preferably less than about 120° C. typically from about 10° C. to 100° C. The reaction temperature is selected so that an ethylene copolymer is produced in the form of solid particles. The reaction pressure is influenced by the choice of diluent and reaction temperature. For example, pressures may range from 15 to 45 atmospheres (about 220 to 660 psi or about 1500 to about 4600 kPa) when isobutane is used as diluent (see, for example, U.S. Pat. No. 4,325,849) to approximately twice that (i.e. from 30 to 90 atmospheres— about 440 to 1300 psi or about 3000-9100 kPa) when propane is used (see U.S. Pat. No. 5,684,097). The pressure in a slurry process must be kept sufficiently high to keep at least part of the ethylene monomer in the liquid phase. The reaction typically takes place in a jacketed closed loop reactor having an internal stirrer (e.g. an impeller) and at least one settling leg. Catalyst, monomers and diluents are fed to the reactor as liquids or suspensions. The slurry circulates through the reactor and the jacket is used to control the temperature of the reactor. Through a series of let down valves the slurry enters a settling leg and then is let down in pressure to flash the diluent and unreacted monomers and recover the polymer generally in a cyclone. The diluent and unreacted monomers are recovered and recycled back to the reactor.

A gas phase process is commonly carried out in a fluidized bed reactor. Such gas phase processes are widely described in the literature (see for example U.S. Pat. Nos. 4,482,687; 4,543,399; 4,588,790; 5,028,670; 5,317,036; 5,352,749; 5,405,922; 5,436,304; 5,453,471; 5,462,999; 5,616,661 and 5,668,228). In general, a fluidized bed gas phase polymerization reactor employs a "bed" of polymer and catalyst which is fluidized by a flow of monomer and other optional components which are at least partially gaseous. Heat is generated by the enthalpy of polymerization of the monomer (and optional comonomer(s)) flowing through the bed. Un-reacted monomer and other optional gaseous components exit the fluidized bed and are contacted with a cooling system to remove this heat. The cooled gas stream, including monomer, and optional other components (such as condensable liquids), is then re-circulated through the polymerization zone, together with "make-up" monomer to replace that which was polymerized on the previous pass. Simultaneously, polymer product is withdrawn from the reactor. As will be appreciated by those skilled in the art, the "fluidized" nature of the polymerization bed helps to evenly distribute/mix the heat of reaction and thereby minimize the formation of localized temperature gradients.

The reactor pressure in a gas phase process may vary from about atmospheric to about 600 Psig. In another embodiment, the pressure can range from about 100 psig (690 kPa) to about 500 psig (3448 kPa). In yet another embodiment, the pressure can range from about 200 psig (1379 kPa) to about 400 psig (2759 kPa). In still another embodiment, the pressure can range from about 250 psig (1724 kPa) to about 350 psig (2414 kPa).

The reactor temperature in a gas phase process may vary according to the heat of polymerization as described above. In a specific embodiment, the reactor temperature can be from about 30° C. to about 130° C. In another specific embodiment, the reactor temperature can be from about 60° C. to about 120° C. In yet another specific embodiment, the reactor temperature can be from about 70° C. to about 110° C. In still yet another specific embodiment, the temperature of a gas phase process can be from about 70° C. to about 100° C.

The fluidized bed process described above is well adapted for the preparation of polyethylene and polyethylene copolymers. Hence, monomers and comonomers include ethylene and $C_{3-12}$ alpha olefins which are unsubstituted or substituted by up to two $C_{1-6}$ hydrocarbyl radicals; $C_{8-12}$ vinyl aromatic olefins which are unsubstituted or substituted by up to two substituents selected from the group consisting of $C_{1-4}$ hydrocarbyl radicals; and $C_{4-12}$ straight chained or cyclic diolefins which are unsubstituted or substituted by a $C_{1-4}$ hydrocarbyl radical. Illustrative non-limiting examples of alpha-olefins that may be copolymerized with ethylene include one or more of propylene, 1-butene, 1-pentene, 4-methyl-1-pentene, 1-hexene, 1-octene, and 1-decene, styrene, alpha methyl styrene, p-t-butyl styrene, and the constrained-ring cyclic olefins such as cyclobutene, cyclopentene, dicyclopentadiene norbornene, hydrocarbyl-substituted norbornenes, alkenyl-substituted norbornenes and the like (e.g. 5-methylene-2-norbornene and 5-ethylidene-2-norbornene, bicyclo-(2,2,1)-hepta-2,5-diene).

In an embodiment, the invention is directed toward a polymerization process involving the polymerization of one or more of the monomer(s) and comonomer(s) including ethylene alone or in combination with one or more linear or branched comonomer(s) having from 3 to 30 carbon atoms, preferably 3-12 carbon atoms, more preferably 4 to 8 carbon atoms. The process is particularly well suited to copolymerization reactions involving polymerization of ethylene in combination with one or more of the comonomers, for example, the alpha-olefins: propylene, 1-butene, 1-pentene, 4-methyl-1-pentene, 1-hexene, 1-octene, 1-decene, styrene and cyclic and polycyclic olefins such as cyclopentene, norbornene and cyclohexene or a combination thereof. Other comonomers for use with ethylene can include polar vinyl monomers, diolefins such as 1,3-butadiene, 1,4-pentadiene, 1,4-hexadiene, 1,5-hexadiene, norbornadiene, and other unsaturated monomers including acetylene and aldehyde monomers. Higher alpha-olefins and polyenes or macromers can be used also. Preferably the comonomer is an alpha-olefin having from 3 to 15 carbon atoms, preferably 4 to 12 carbon atoms and most preferably 4 to 10 carbon atoms.

In an embodiment of the present invention, ethylene is copolymerized with an alpha olefin having from 3-10 carbon atoms and ethylene makes up at least 75 wt % of the total olefin feed entering the reactor.

In an embodiment of the present invention, ethylene is copolymerized with an alpha olefin having from 3-10 carbon atoms and ethylene makes up at least 85 wt % of the total olefin feed entering the reactor.

In embodiments of the present invention, ethylene is copolymerized with propylene, 1-butene, 1-hexene or 1-octene.

In an embodiment of the present invention, ethylene is copolymerized with 1-butene and ethylene makes up at least 75 weight % (i.e. wt %) of the total olefin feed entering the reactor.

In an embodiment of the present invention, ethylene is copolymerized with 1-hexene and ethylene makes up at least 75 wt % of the total olefin feed entering the reactor.

In an embodiment of the present invention, ethylene is copolymerized with 1-hexene and ethylene makes up at least 85 wt % of the total olefin feed entering the reactor.

Gas phase fluidized bed polymerization processes may employ a polymer seed bed in the reactor prior to initiating the polymerization process. It is contemplated by the current invention to use a polymer seed bed that has been treated with an antistatic agent or an optional scavenger. In addition, the polymer products obtained by using the catalysts and processes of the current invention may themselves be used as polymer seed bed materials.

Optionally, scavengers are added to the polymerization process. The present invention can be carried out in the presence of any suitable scavenger or scavengers. Scavengers are well known in the art.

In an embodiment of the invention, scavengers are organoaluminum compounds having the formula: $Al^3(X^3)_n(X^4)_{3-n}$, where $(X^3)$ is a hydrocarbyl having from 1 to about 20 carbon atoms; $(X^4)$ is selected from alkoxide or aryloxide, any one of which having from 1 to about 20 carbon atoms; halide; or hydride; and n is a number from 1 to 3, inclusive; or hydrocarbyl aluminoxanes having the formula: $R^3{}_2Al^1O(R^3Al^1O)_mAl^1R^3{}_2$ wherein each $R^3$ is independently selected from the group consisting of $C_{1-20}$ hydrocarbyl radicals and m is from 3 to 50. Some non-limiting preferred scavengers useful in the current invention include triisobutylaluminum, triethylaluminum, trimethylaluminum or other trihydrocarbyl aluminum compounds.

The scavenger may be used in any suitable amount but by way of non-limiting examples only, can be present in an amount to provide a molar ratio of Al:M (where M is the metal of the phosphinimine catalyst) of from about 20 to about 2000, or from about 50 to about 1000, or from about 100 to about 500. Generally the scavenger is added to the reactor prior to the polymerization catalyst and in the absence of additional poisons and over time declines to 0, or is added continuously.

Optionally, the scavengers may be independently supported. For example, an inorganic oxide that has been treated with an organoaluminum compound or hydrocarbyl aluminoxane may be added to the polymerization reactor. The method of addition of the organoaluminum or hydrocarbyl aluminoxane compounds to the support is not specifically defined and is carried out by procedures well known in the art.

The scavenger can be fed to the reactor using any suitable means and may be diluted or dissolved in a suitable liquid hydrocarbon diluent or solvent respectively.

EXAMPLES

Preparation of the Supported Polymerization Catalyst 2.0 g of $Zr(SO_4)_2 \cdot 4H_2O$ purchased from Strem Chemicals Inc was dissolved in 39.5 mL of distilled water. The aqueous solution was sprayed over 20 g of Sylopol 2408 silica supplied by GRACE Davison while stirring. The resulting silica was dried overnight in an oven at 120-140° C. The silica was then dehydrated by fluidization in a glass column first under a flow of air for 2 hrs at 200° C., then under a flow of nitrogen for 6 hrs at 600° C.

8.81 g of the calcined silica prepared above was slurried in 50 mL of toluene. 30.64 g of 10 wt % MAO in toluene solution containing 4.5 wt % Al purchased from Albemarle was added to the silica slurry. The resulting slurry was mixed using a shaker for 1 hour at ambient temperature. Separately, 0.242 g of the $((C_6F_5)Cp)Ti(N=P(t-Bu)_3)Cl_2$ molecule, the preparation of which has been described in U.S. Pat. No. 20100190937A1, was dissolved in toluene and the solution was added to the MAO/silica slurry. After two hours of mixing at room temperature using a shaker, the slurry was filtered, yielding a colorless filtrate. The solid component was washed successively with toluene and twice with pentane, then dried in vacuo to ~400 mTorr and sealed under nitrogen until use.

Gas Phase Polymerization

Example 1 (Comparative)

A 2 L reactor fitted with a stirrer and containing 160 g of a NaCl seed bed that had been dried for at least 3 days at 130° C. was conditioned for 30 minutes at 105° C. An injection tube loaded with 30 mg of the catalyst powder was connected to the reactor which was then purged 3 times with nitrogen and once with ethylene at 200 psig. Pressure and temperature were reduced in the reactor (below 2 psi and between 60 and 85° C.) and TIBAL (500:1 Al:Ti) was injected via a gas-tight syringe followed by a 2 mL pre-charge of 1-hexene. After the reactor reached 85° C., the catalyst was injected using ethylene pressure and the reactor was pressurized to 200 psi total pressure with 1-hexene fed with a mass flow controller at a molar ratio of 2.2~2.7% $C_6/C_2$. The temperature of reaction was controlled at 90° C. for a total runtime of 60 minutes.

Reaction was terminated by stopping the ethylene flow and turning on reactor cooling water. 97.5 g of ethylene/1-hexene copolymer was produced.

Example 2 (Comparative)

This example was carried out in the same manner as Example 1. 90.0 g of ethylene/1-hexene copolymer was produced Example 3 (Inventive)

This example was carried out in a manner similar to Example 1, except that the catalyst was injected as a slurry in Kaydol mineral oil. The catalyst slurry was prepared as follows: 5 mL of a Kaydol oil that had been dried over 3 Å molecular sieves for weeks and thoroughly purged with nitrogen gas was treated with 0.05 mL of a 25 wt % TiBAL solution in hexane and stirred for 5 minutes. 0.30 g of the supported catalyst prepared above was added to the Kaydol and the resulting slurry was shaken well to ensure good suspension of catalyst particles in the Kaydol (6.4 percent by weight of solid catalyst in Kaydol mineral oil). 0.5 mL of the catalyst/oil slurry was then injected into the reactor using a gas-tight syringe. 92.0 g of ethylene/1-hexene copolymer was produced after 1 hour of polymerization.

TABLE 1

Catalyst Slurry Feed vs. Catalyst Dry Feed

| | Catalyst Feeding Mode | Productivity (g pol/g cat) | Maximum Ethylene Flow Rate (std L/min) | Reaction Time to Reach Maximum Ethylene Flow Rate (min) | Temperature Excursion[1] (° C.) |
|---|---|---|---|---|---|
| Example 1 (comparative) | dry feed | 3250 | 3.0 | <1 | 2.3 |
| Example 2 (comparative) | dry feed | 3000 | 3.1 | <1 | 3.6 |
| Example 3 (inventive) | slurry feed | 3067 | 1.4 | 10.0 | 1.9 |

[1]The temperature excursion is defined as the difference between the maximum recorded reactor temperature and the set reactor temperature (namely 90° C.). For reactions using a similar amount of catalyst, higher temperature excursion implies poorer control of the reactor temperature to the target value.

Figure 1:
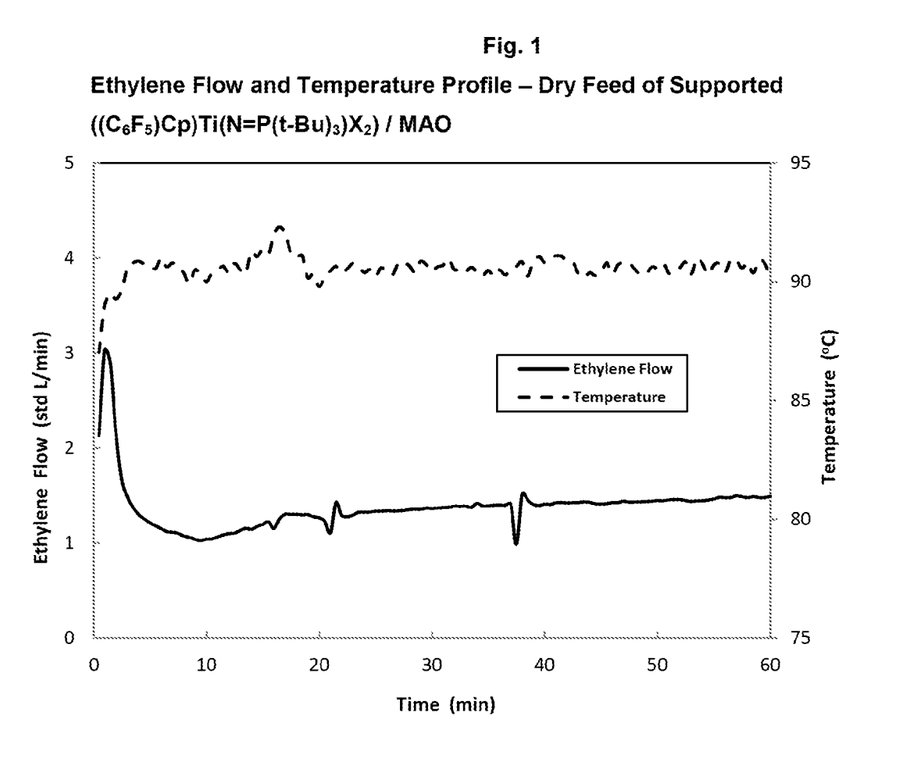
FIG. 1 shows the ethylene flow and temperature profiles during a gas phase polymerization of ethylene/1-hexene using a supported $((C_6F_5)Cp)Ti(N\text{=}P(t\text{-}Bu)_3)Cl_2/MAO$ catalyst which is fed to a reactor as a solid.
Figure 2:
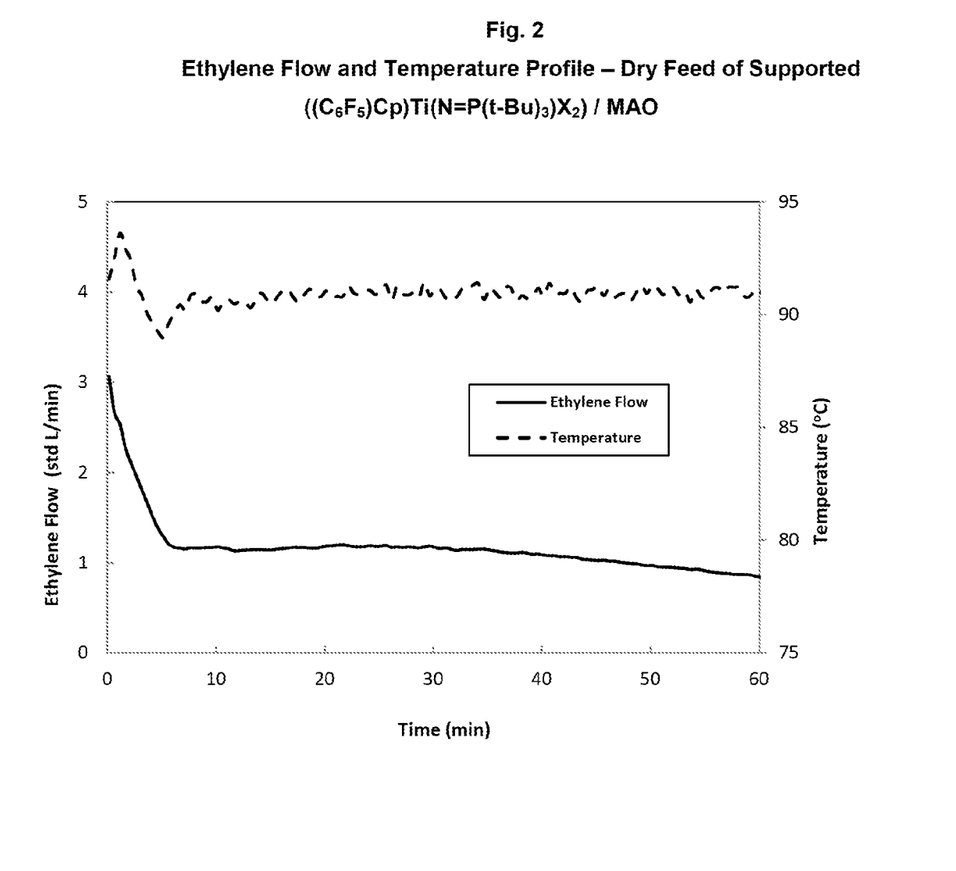
FIG. 2 shows the ethylene flow and temperature profiles for another gas phase polymerization of ethylene/1-hexane using a supported $((C_6F_5)Cp)Ti(N\text{=}P(t\text{-}Bu))Cl_2/MAO$ catalyst which is fed to a gas phase reactor as a solid.

FIGS. 1 and 2 illustrate the kinetic profiles for Comparative Examples 1 and 2, respectively. In these two experiments, the catalyst was dry fed into the reactor in particulate form. As seen from these two figures, the catalyst exhibited a high initial surge in activity as represented by ethylene flow rate of more than 3 std L/min in less than 1 minute. This initial surge was followed by a sharp decrease in catalyst activity.

Figure 3:
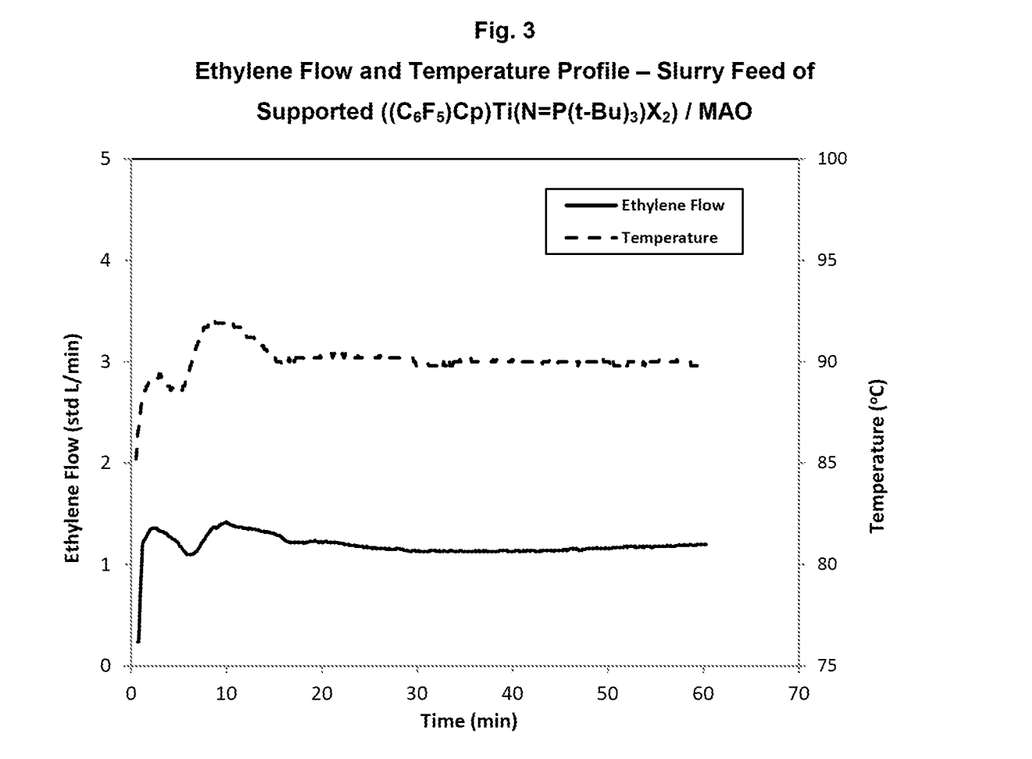
FIG. 3 shows the ethylene flow and temperature profiles for a gas phase polymerization of ethylene/1-hexane using a supported $((C_6F_5)Cp)Ti(N\text{=}P(t\text{-}Bu)_3)Cl_2/MAO$ catalyst which is fed to a gas phase reactor as a slurry in mineral oil.

FIG. 3 shows the kinetic profile of an Inventive Example in which the supported catalyst was fed as a slurry in mineral oil. The catalyst showed an induction period and activated more slowly as evidenced from a slower rise in initial surge in ethylene flow up to a maximum of only 1.4 std L/min, followed by a steady activity throughout the run. Despite the lower maximum flow rate, because the slurry feed polymerization catalyst was able to maintain steady activity until the end of the run, the overall productivity (or average activity) of the slurry form catalyst was comparable to the dry form catalyst (Examples 1 and 2). Feeding the slurry form polymerization catalyst also resulted in better control of the reaction temperature. As shown in FIG. 3, the temperature excursion was only 1.9° C. for the slurry form catalyst, compared to 2.3° C. and 3.6° C. observed in FIGS. 1 and 2 respectively for dry fed polymerization catalysts.

What is claimed is:

1. A polymerization process comprising:
   introducing ethylene and at least one alpha olefin to a gas-phase reactor;
   introducing a catalyst slurry comprising a supported polymerization catalyst and a mineral oil to the reactor; and
   polymerizing the ethylene and the at least one alpha olefin in the presence of the supported polymerization catalyst;
   wherein said supported polymerization catalyst comprises:
   i) a phosphinimine catalyst having the formula $((R^*)(Ar-F)C_5H_3)Ti(N=P(t-Bu)_3)X_2$;
   where $R^*$ is hydrogen or a hydrocarbyl group, Ar—F is a perfluorinated aryl group, a 2,6 fluoro substituted phenyl group, a 2,4,6 fluoro substituted phenyl group, or a 2,3,5,6 fluoro substituted phenyl group; and X is an activatable ligand; ii) a cocatalyst, and iii) an inert support.

2. The process of claim 1 wherein the phosphinimine catalyst has the formula $(1,2-(R^*)(Ar-F)C_5H_3)Ti(N=P(t-Bu)_3)X_2$; where $R^*$ is a hydrocarbyl group having from 1 to 20 carbon atoms; Ar—F is a perfluorinated aryl group, a 2,6 fluoro substituted phenyl group, a 2,4,6 fluoro substituted phenyl group, or a 2,3,5,6 fluoro substituted phenyl group; and X is an activatable ligand.

3. The process of claim 1 wherein the phosphinimine catalyst has the formula $((Ar-F)Cp)Ti(N=P(t-Bu)_3)X_2$; where Ar—F is a perfluorinated aryl group, a 2,6 fluoro substituted phenyl group, a 2,4,6 fluoro substituted phenyl group, or a 2,3,5,6 fluoro substituted phenyl group; and X is an activatable ligand.

4. The process of claim 1 wherein the mineral oil makes up at least 75 wt % of the entire weight of the catalyst slurry.

5. The process of claim 1 wherein the gas phase reactor is a fluidized bed reactor.

6. A method for increasing the induction period of a supported polymerization catalyst in a gas phase polymerization process, the method comprising:
   combining the supported polymerization catalyst with mineral oil to give a catalyst slurry; and
   introducing the catalyst slurry to a gas phase reactor to polymerize ethylene and at least one alpha olefin;
   wherein the supported polymerization catalyst comprises: i) a phosphinimine catalyst having the formula $((R^*)(Ar-F)C_5H_3)Ti(N=P(t-Bu)_3)X_2$; where $R^*$ is hydrogen or a hydrocarbyl group; Ar—F is a perfluorinated aryl group, a 2,6 fluoro substituted phenyl group, a 2,4,6 fluoro substituted phenyl group, or a 2,3,5,6 fluoro substituted phenyl group; and X is an activatable ligand; ii) a cocatalyst, and iii) an inert support.

7. The method of claim 6 wherein the phosphinimine catalyst has the formula $(1,2-(R^*)(Ar-F)C_5H_3)Ti(N=P(t-Bu)_3)X_2$; where $R^*$ is a hydrocarbyl group having from 1 to 20 carbon atoms; Ar—F is a perfluorinated aryl group, a 2,6 fluoro substituted phenyl group, a 2,4,6 fluoro substituted phenyl group, or a 2,3,5,6 fluoro substituted phenyl group; and X is an activatable ligand.

8. The method of claim 6 wherein the phosphinimine catalyst has the formula $((Ar-F)Cp)Ti(N=P(t-Bu)_3)X_2$; where Ar—F is a perfluorinated aryl group, a 2,6 fluoro substituted phenyl group, a 2,4,6 fluoro substituted phenyl group, or a 2,3,5,6 fluoro substituted phenyl group; and X is an activatable ligand.

9. The method of claim 6 wherein the mineral oil makes up at least 75 wt % of the entire weight of the catalyst slurry.

* * * * *